US011115648B2

(12) United States Patent
Liu

(10) Patent No.: US 11,115,648 B2
(45) Date of Patent: Sep. 7, 2021

(54) DISPLAY DEVICE, AND METHOD AND APPARATUS FOR ADJUSTING IMAGE PRESENCE ON DISPLAY DEVICE

(71) Applicant: Huawei Technologies Co., Ltd., Shenzhen (CN)

(72) Inventor: Mu Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/854,419

(22) Filed: Apr. 21, 2020

(65) Prior Publication Data
US 2020/0267380 A1 Aug. 20, 2020

Related U.S. Application Data

(63) Continuation of application No. PCT/CN2018/091076, filed on Jun. 13, 2018.

(30) Foreign Application Priority Data

Oct. 30, 2017 (CN) .......................... 201711038481.5

(51) Int. Cl.
H04N 13/344 (2018.01)
H04N 13/128 (2018.01)
H04N 13/371 (2018.01)

(52) U.S. Cl.
CPC ......... H04N 13/344 (2018.05); H04N 13/128 (2018.05); H04N 13/371 (2018.05)

(58) Field of Classification Search
CPC .......... G02B 2027/0138; G02B 27/017; H04N 13/111; H04N 13/128; H04N 13/344; H04N 13/371
See application file for complete search history.

(56) References Cited

U.S. PATENT DOCUMENTS

| 6,215,461 | B1* | 4/2001 | Ishibashi | .............. H04N 13/366 345/8 |
| 10,048,922 | B2* | 8/2018 | Kobayashi | ......... G02B 27/0093 |
| 2002/0163621 | A1* | 11/2002 | Bar | ....................... G02C 13/005 351/159.19 |
| 2007/0103641 | A1* | 5/2007 | Bonnin | ..................... A61B 5/11 351/209 |
| 2010/0026787 | A1* | 2/2010 | Yasuda | ................ H04N 13/332 348/47 |

(Continued)

FOREIGN PATENT DOCUMENTS

| CN | 103119623 A | 5/2013 |
| CN | 104076513 A | 10/2014 |

(Continued)

Primary Examiner — Peter D Le
(74) Attorney, Agent, or Firm — Conley Rose, P.C.

(57) ABSTRACT

A display device includes a display device body. The display device body includes a first lens barrel and a second lens barrel. A first lens is disposed at a first end of the first lens barrel, and a second lens is disposed at a first end of the second lens barrel. A first distance sensor and a second distance sensor are further disposed on the display device body. The second distance sensor is configured to measure a distance between a right eyeball and the second lens. Two distance sensors are disposed on the display device body.

16 Claims, 9 Drawing Sheets

(56) References Cited

U.S. PATENT DOCUMENTS

| | | | |
|---|---|---|---|
| 2010/0079356 A1* | 4/2010 | Hoellwarth | G06F 3/041 345/8 |
| 2013/0170754 A1 | 7/2013 | Tsukizawa et al. | |
| 2013/0241805 A1* | 9/2013 | Gomez | G06F 3/013 345/8 |
| 2013/0258486 A1* | 10/2013 | Ionescu | G02B 27/0172 359/630 |
| 2014/0132485 A1* | 5/2014 | Kim | G02B 27/0172 345/8 |
| 2014/0153102 A1* | 6/2014 | Chang | G02B 27/0172 359/630 |
| 2014/0184496 A1* | 7/2014 | Gribetz | G06F 3/011 345/156 |
| 2014/0247286 A1* | 9/2014 | Chi | G02B 27/0093 345/672 |
| 2014/0268336 A1* | 9/2014 | Hiraide | G02B 27/0172 359/507 |
| 2014/0333665 A1* | 11/2014 | Sylvan | G06F 3/013 345/633 |
| 2015/0035726 A1* | 2/2015 | Li | G02B 27/0172 345/8 |
| 2015/0035744 A1* | 2/2015 | Robbins | G02B 27/0172 345/156 |
| 2015/0261003 A1* | 9/2015 | Morifuji | H04N 13/144 345/8 |
| 2015/0273179 A1* | 10/2015 | Krueger | G01C 9/12 600/27 |
| 2015/0288944 A1* | 10/2015 | Nistico | G06T 15/20 345/156 |
| 2015/0370071 A1* | 12/2015 | Alton | G02B 27/0101 349/11 |
| 2016/0033770 A1* | 2/2016 | Fujimaki | H04N 13/344 345/8 |
| 2016/0054565 A1* | 2/2016 | Izumihara | G02B 27/017 345/8 |
| 2016/0063767 A1* | 3/2016 | Lee | G06T 19/006 345/419 |
| 2016/0091720 A1* | 3/2016 | Stafford | G02B 27/0093 345/8 |
| 2016/0131908 A1* | 5/2016 | Fateh | G06F 3/016 345/633 |
| 2016/0302663 A1* | 10/2016 | Fayolle | G02C 11/10 |
| 2016/0320623 A1* | 11/2016 | Miyao | H04N 13/344 |
| 2017/0102549 A1* | 4/2017 | Lee | G02B 27/0172 |
| 2017/0116476 A1 | 4/2017 | Publicover et al. | |
| 2017/0161956 A1* | 6/2017 | Fu | G06F 1/1686 |
| 2017/0235129 A1* | 8/2017 | Kamakura | G02B 27/0006 345/8 |
| 2017/0261752 A1* | 9/2017 | Koshihara | G02B 27/017 |
| 2017/0299869 A1 | 10/2017 | Urey et al. | |
| 2018/0003919 A1* | 1/2018 | Song | G06K 9/0061 |
| 2018/0033177 A1* | 2/2018 | Han | A63F 13/211 |
| 2018/0150690 A1 | 5/2018 | Yin | |
| 2019/0154952 A1* | 5/2019 | Zheng | G02B 7/04 |
| 2019/0246889 A1* | 8/2019 | Marin | A61B 3/028 |

FOREIGN PATENT DOCUMENTS

| | | |
|---|---|---|
| CN | 104094280 A | 10/2014 |
| CN | 104216841 A | 12/2014 |
| CN | 105549209 A | 5/2016 |
| CN | 205485069 U | 8/2016 |
| CN | 106019588 A | 10/2016 |
| CN | 106019589 A | 10/2016 |
| CN | 205826969 U | 12/2016 |
| CN | 106445167 A | 2/2017 |
| CN | 106802486 A | 6/2017 |
| CN | 206301289 U | 7/2017 |
| CN | 107132657 A | 9/2017 |
| CN | 107167924 A | 9/2017 |
| WO | 2015057994 A1 | 4/2015 |
| WO | 2017179938 A1 | 10/2017 |

\* cited by examiner

DISPLAY DEVICE, AND METHOD AND APPARATUS FOR ADJUSTING IMAGE PRESENCE ON DISPLAY DEVICE

CROSS-REFERENCE TO RELATED APPLICATION

This application is a continuation of International Patent Application No. PCT/CN2018/091076, filed on Jun. 13, 2018, which claims priority to Chinese Patent Application No. 201711038481.5, filed on Oct. 30, 2017, both of which are hereby incorporated by reference in their entireties.

TECHNICAL FIELD

This disclosure relates to the field of display devices, and in particular, to a display device, and a method and an apparatus for adjusting image presence on a display device.

BACKGROUND

As a virtual reality technology and an augmented reality technology develop, display devices such as a virtual reality helmet and virtual reality glasses emerge in succession. A user may wear a display device. The display device displays an image, and the user may see the image through a lens in the display device, to experience a virtual or augmented world. A position of the lens usually needs to be adjusted to achieve a clear watching effect such that a lens center is aligned to a pupil center in a horizontal direction and in a vertical direction.

In related technologies, a display device obtains a left pupil image of a user and a right pupil image of the user, determines coordinates of a left pupil and coordinates of a right pupil, calculates an interpupillary distance based on the two pairs of coordinates, and adjusts positions of a left lens and a right lens based on the obtained interpupillary distance such that both a distance between the left lens and a central axis of the display device and a distance between the right lens and the central axis of the display device are half the interpupillary distance. The interpupillary distance is a distance between a center point of the left pupil and a center point of the right pupil. Specifically, referring to FIG. 1, a center point O of two eyes is defined as an origin, and a direction of an axis x is a horizontal direction. A distance |OB| between a leftmost position B of a right pupil and the origin and a distance |OB'| between a rightmost position B' of the right pupil and the origin are obtained. Likewise, a distance |OA| between a leftmost position A of a left pupil and the origin and a distance |OA'| between a rightmost position A' of the left pupil and the origin are obtained. Calculation is performed using the following formula, to obtain an interpupillary distance (ipd), and a distance between a left lens and a central axis and a distance between a right lens and the central axis are adjusted to ipd/2

$$ipd = \frac{|OA| + |OA'|}{2} + \frac{|OB| + |OB'|}{2}.$$

Related technologies have at least the following problems distances between pupils of users and the display device may be different due to a wearing habit difference of the users, and consequently, sizes of photographed pupil images are different, a measured interpupillary distance has relatively low precision, and a clear watching effect cannot be achieved when a position of a lens is adjusted based on the interpupillary distance with such low precision.

SUMMARY

Embodiments of this disclosure provide a display device, and a method and an apparatus for adjusting image presence on a display device, to resolve a problem in related technologies that a measured interpupillary distance has relatively low precision. The technical solutions are as follows.

According to a first aspect, a display device is provided, where the display device includes a display device body, the display device body includes a first lens barrel and a second lens barrel, a first lens is disposed at a first end of the first lens barrel, and a second lens is disposed at a first end of the second lens barrel, a first distance sensor and a second distance sensor are further disposed on the display device body, the first distance sensor and the second distance sensor are symmetrically disposed on two sides of a longitudinal central axis of the display device body, the first distance sensor is configured to measure a distance between a left eyeball and the first lens, and the second distance sensor is configured to measure a distance between a right eyeball and the second lens.

According to the display device provided in this embodiment, two distance sensors are disposed on the display device body, the first distance sensor measures the distance between the left eyeball and the first lens, and the second distance sensor measures the distance between the right eyeball and the second lens such that after a left pupil image and a right pupil image are separately normalized based on the two distances, impact of a distance between a pupil and the display device can be canceled. This helps obtain a high-precision interpupillary distance, and after a position of a lens is adjusted based on the high-precision interpupillary distance, a clear watching effect can be achieved.

In a possible design, the first distance sensor is disposed in an edge region at the first end of the first lens barrel, and the second distance sensor is disposed in an edge region at the first end of the second lens barrel.

In a possible design, the first distance sensor is disposed at an intersecting point that is close to the longitudinal central axis in two intersecting points of the edge region at the first end of the first lens barrel and a traverse central axis of the display device body, and the second distance sensor is disposed at an intersecting point that is close to the longitudinal central axis in two intersecting points of the edge region at the first end of the second lens barrel and the traverse central axis of the display device body.

In this possible design, the distances measured by the first distance sensor and the second distance sensor are actually distances between inner eye corners and corresponding distance sensors. This ensures that the measured distances are not affected by different depths of eye sockets of users, and improves accuracy of the measured distances.

In a possible design, the first distance sensor is disposed on an outer side of the edge region at the first end of the first lens barrel, and the second distance sensor is disposed on an outer side of the edge region at the first end of the second lens barrel.

In a possible design, the first distance sensor is disposed on a first vertical line, and the first vertical line is a straight line that is parallel to the longitudinal central axis and that is through a lens center of the first lens, and the second distance sensor is disposed on a second vertical line, and the second vertical line is a straight line that is parallel to the longitudinal central axis and that is through a lens center of the second lens.

In a possible design, a light-emitting diode (LED) unit is disposed in the edge region at the first end of the first lens barrel, and an LED unit is disposed in the edge region at the first end of the second lens barrel.

According to a second aspect, a method for adjusting image presence on a display device is provided, where the method includes obtaining a first image and a second image, where the first image includes a left eyeball image of a user, and the second image includes a right eyeball image of the user, obtaining a first distance between a first lens and a left eyeball of the user, where the first lens is a lens that is closest to the left eyeball of the user in all lenses of the display device, obtaining a second distance between a second lens and a right eyeball of the user, where the second lens is a lens that is closest to the right eyeball of the user in all the lenses of the display device, separately normalizing the first image and the second image based on the first distance and the second distance, calculating an interpupillary distance between the left eyeball of the user and the right eyeball of the user based on a normalized first image and a normalized second image, and adjusting the first lens and/or the second lens based on the interpupillary distance of the user.

According to the method provided in this embodiment, the first image and the second image are separately normalized based on the first distance between the first lens and the left eyeball and the second distance between the second lens and the right eyeball. For both the normalized first image and the normalized second image, impact caused by different distances between pupils of users and the display device is canceled. Therefore, the interpupillary distance calculated based on the normalized first image and the normalized second image does not have an error that is generated due to the different distances between the pupils of the users and the display device, and has relatively high precision. When a position of a lens is adjusted based on the interpupillary distance with such high precision, a clear watching effect can be achieved.

In a possible design, the separately normalizing the first image and the second image based on the first distance and the second distance includes calculating a ratio of the first distance to a preset reference distance, to obtain a first scaling coefficient, where the preset reference distance is a distance between the first lens and the left eyeball of the user when a pupil image with a preset size is obtained, or a distance between the second lens and the right eyeball of the user when the pupil image with the preset size is obtained, calculating a ratio of the second distance to the preset reference distance, to obtain a second scaling coefficient, scaling the first image using the first scaling coefficient, and scaling the second image using the second scaling coefficient.

In a possible design, the separately normalizing the first image and the second image based on the first distance and the second distance includes detecting a wear status of the display device based on the first distance and the second distance, or detecting a wear status of the display device based on the first image and the second image, and when it is determined that the display device is worn normally, separately normalizing the first image and the second image based on the first distance and the second distance.

In this possible design, the wear status of the display device is detected, and then a position of a lens is adjusted when the display device is worn normally in order to avoid a problem that an inaccurate interpupillary distance is measured because the display device is worn aslant.

In a possible design, the detecting a wear status of the display device based on the first distance and the second distance includes calculating a difference between the first distance and the second distance, and when the difference is less than a first preset difference, determining that the display device is worn normally.

In a possible design, the detecting a wear status of the display device based on the first image and the second image includes, when point coordinates of a pupil center in the first image belong to a preset range of the first image, and point coordinates of a pupil center in the second image belong to a preset range of the second image, determining that the display device is worn normally.

In a possible design, the detecting a wear status of the display device based on the first image and the second image includes calculating a distance between point coordinates of a pupil center in the first image and a reference position in the first image, to obtain a third distance, calculating a distance between point coordinates of a pupil center in the second image and a reference position in the second image, to obtain a fourth distance, and when a difference between the third distance and the fourth distance is less than a second preset difference, determining that the display device is worn normally.

In a possible design, after the detecting a wear status of the display device based on the first distance and the second distance, or detecting a wear status of the display device based on the first image and the second image, the method further includes, when it is determined that the display device is worn abnormally, prompting, in a preset prompt manner, the user to re-wear the display device.

In this possible design, the user is prompted in the preset prompt manner to re-wear the display device. This can guide the user to correctly wear the display device, and is more humanized.

In a possible design, the separately normalizing the first image and the second image based on the first distance and the second distance includes detecting an eye-open status of the user based on the first distance, the second distance, the first image, and the second image, and when it is determined that the eye-open status is normal, separately normalizing the first image and the second image based on the first distance and the second distance.

In this possible design, the eye-open status of the user is detected, and then a position of a lens is adjusted when the eye-open status is normal in order to avoid a problem that an inaccurate interpupillary distance is measured during image photographing due to a case in which the eye-open status is abnormal, for example, the user closes an eye.

In a possible design, the detecting an eye-open status of the user based on the first distance, the second distance, the first image, and the second image includes calculating a ratio of a left pupil diameter to a preset pupil diameter, to obtain a first specified coefficient, and calculating a ratio of a right pupil diameter to the preset pupil diameter, to obtain a second specified coefficient, where the preset pupil diameter is a pupil diameter detected when the distance between the first lens and the left eyeball of the user is a preset reference distance and the eye-open status is normal, or the preset pupil diameter is a pupil diameter detected when the distance between the second lens and the right eyeball of the user is the preset reference distance and the eye-open status is normal, the left pupil diameter is determined based on the first image, and the right pupil diameter is determined based on the second image, and when both a difference between the first scaling coefficient and the first specified coefficient and a difference between the second scaling coefficient and the second specified coefficient are less than a third preset difference, determining that the eye-open status is normal, where the first scaling coefficient is a ratio of the first distance to the preset reference distance, and the second scaling coefficient is a ratio of the second distance to the preset reference distance.

In a possible design, the preset pupil diameter is an average value of sample pupil diameters obtained through detection based on a plurality of first image samples or a plurality of second image samples obtained by the display device.

In a possible design, after the calculating an interpupillary distance between the left eyeball of the user and the right eyeball of the user based on a normalized first image and a normalized second image, the method further includes obtaining a user identity of the user, and storing a correspondence between the user identity and the interpupillary distance of the user.

In this possible design, after the interpupillary distance is obtained through measurement, the correspondence between the user identity and the interpupillary distance of the user may be stored such that when the user wears the display device next time, the interpupillary distance, corresponding to the user identity, of the user can be directly obtained from the correspondence, and the interpupillary distance of the user does not need to be re-obtained. This helps quickly obtain the interpupillary distance, quickly adjust a distance between the lenses, save time, and improve efficiency.

According to a third aspect, an apparatus for adjusting image presence on a display device is provided. The apparatus includes a plurality of function modules, to implement the method for adjusting image presence on a display device according to any one of the second aspect or the possible designs of the second aspect.

According to a fourth aspect, a computer readable storage medium is provided. The computer readable storage medium stores an instruction. The instruction is executed by a processor to perform the method for adjusting image presence on a display device according to any one of the second aspect or the possible designs of the second aspect.

DESCRIPTION OF EMBODIMENTS

To make the objectives, technical solutions, and advantages of this disclosure clearer, the following further describes the embodiments of this disclosure in detail with reference to the accompanying drawings.

Figure 1:
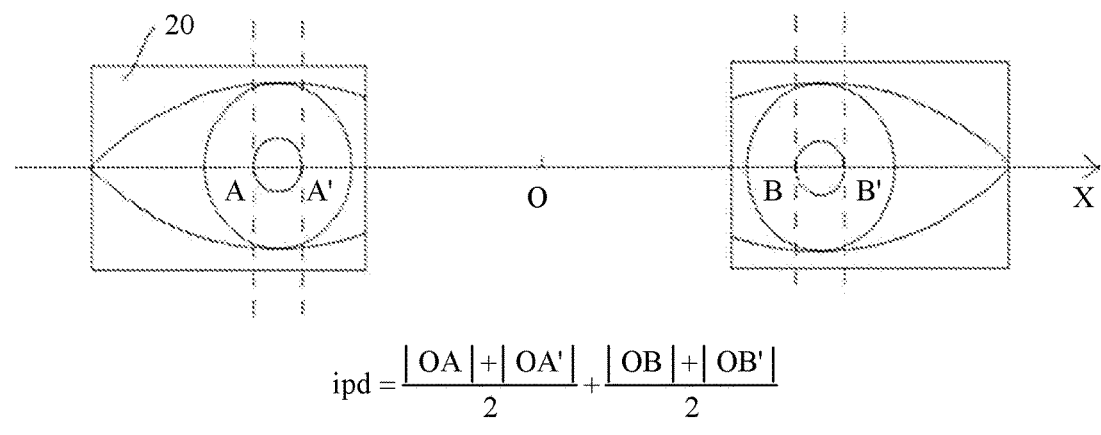
FIG. 1 is a schematic diagram of a method for adjusting image presence on a display device provided in related technologies.
Figure 2:
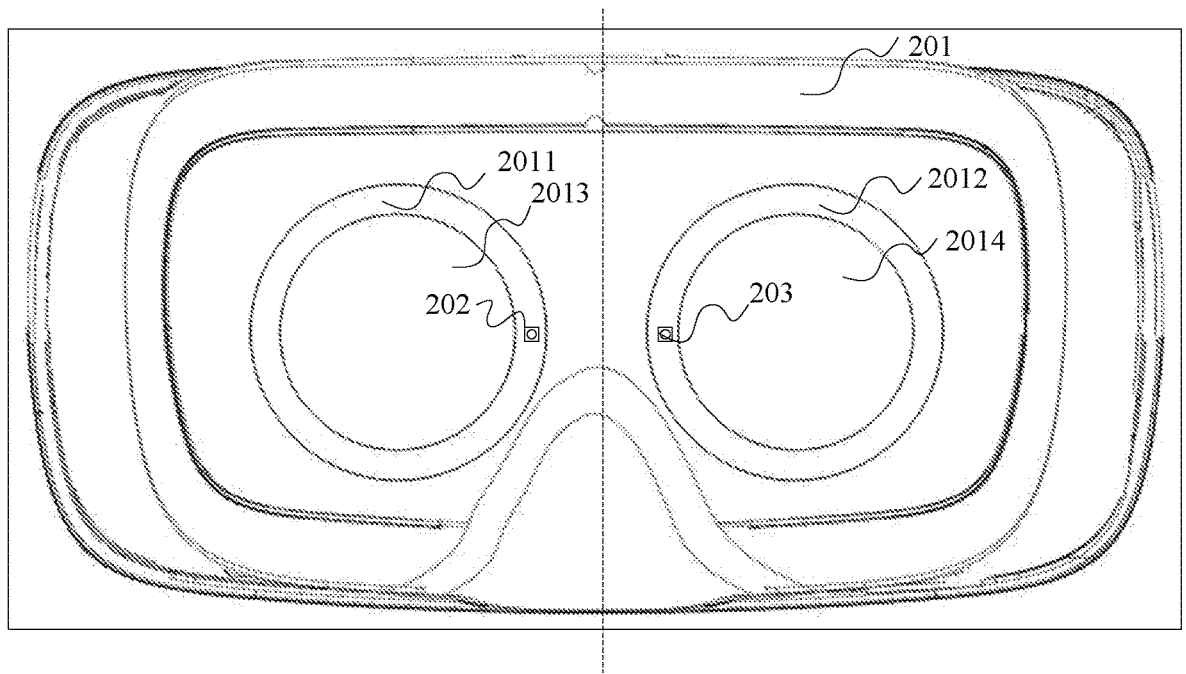
FIG. 2 is a schematic structural diagram of a display device according to an embodiment of this disclosure.

FIG. 2 is a schematic structural diagram of a display device according to an embodiment of this disclosure. The display device is a head-mounted display device, and may be a virtual reality device, for example, a virtual reality helmet or virtual reality glasses, or may be an augmented reality device, for example, an augmented reality helmet.

Referring to FIG. 2, the display device includes a display device body 201, and a first distance sensor 202 and a second distance sensor 203 are disposed on the display device body 201. The display device body 201 includes a first lens barrel 2011 and a second lens barrel 2012, a first lens 2013 is disposed at a first end of the first lens barrel 2011, and a second lens 2014 is disposed at a first end of the second lens barrel 2012. Optionally, the display device body 201 may further include a first camera module, a second camera module, a first motor, a second motor, a display screen, and a processor. In addition, the display device body 201 may further include another component configured to implement a display function.

(1) First lens barrel 2011 and second lens barrel 2012.

The first lens barrel 2011 and the second lens barrel 2012 each include two opposite ends. To distinguish between descriptions, herein, an end that faces a user on the display device when the display device is worn normally is referred to as a first end. The first lens 2013 is fixed in an edge region at the first end of the first lens barrel 2011, and the second lens 2014 is fixed in an edge region at the first end of the second lens barrel 2012.

The fixing manner may include the following two designs. A manner of fixing the first lens 2013 in the edge region of the first lens barrel 2011 is used as an example for description below, and a manner of fixing the second lens 2014 in the edge region of the second lens barrel 2012 is similar.

In a first possible design, the edge region at the first end of the first lens barrel 2011 may be a lens cap of the first lens barrel 2011. The edge region is tightly engaged with the first lens 2013 such that the first lens 2013 is fastened at the first end of the first lens barrel 2011. A plurality of screws may be disposed in the edge region. The plurality of screws pass through the edge region, and are inserted into a plurality of through-holes on an outer edge of the first lens 2013 such that the first lens 2013 is fixed to the first lens barrel 2011. For another example, the edge region may be fixed to the first lens 2013 using glue or in a welding manner.

In a second possible design, the edge region at the first end of the first lens barrel 2011 may be an edge at the first end of the first lens barrel 2011. An inner wall of the edge region tightly fits the outer edge of the first lens 2013. The first lens 2013 is clutched inside the edge region and fixed to the edge region, to prevent the first lens 2013 from slipping off from the edge region. The inner wall of the edge region may be fixed and connected to the outer edge of the first lens 2013 using glue or a screw or in a welding manner.

(2) First lens 2013 and second lens 2014.

The first lens 2013 may be a lens with a positive focal length or a lens with a negative focal length. The first lens 2013 may include a first lens surface and a second lens surface. The first lens surface faces the first end, and may face a left eye of the user when the display device is worn normally. The first lens surface may be a convex surface, and a convex direction is towards the first end. The second lens surface is opposite to the first lens surface, and faces the interior of the display device when the display device is worn normally. The second lens surface may be a concave surface, and a concave direction is also towards the first end. Alternatively, both the first lens surface and the second lens surface may be convex surfaces. Alternatively, the first lens surface may be a concave surface, and the second lens surface may be a convex surface.

The second lens 2014 is similar to the first lens 2013. In an embodiment, the second lens 2014 may include a third lens surface and a fourth lens surface. The third lens surface faces the first end, and may face a right eye of the user when the display device is worn normally. The third lens surface may be a convex surface, and a convex direction is towards the first end. The fourth lens surface is opposite to the third lens surface, and faces the interior of the display device when the display device is worn normally. The fourth lens surface may be a concave surface, and a concave direction is also towards the first end. Alternatively, both the third lens surface and the fourth lens surface may be convex surfaces. Alternatively, the third lens surface may be a concave surface, and the fourth lens surface may be a convex surface.

(3) First distance sensor 202 and second distance sensor 203.

The first distance sensor 202 and the second distance sensor 203 are symmetrically disposed on two sides of a longitudinal central axis of the display device body 201. The longitudinal central axis is a central axis of the display device in a vertical direction. The symmetrical disposing means that the first distance sensor 202 and the second distance sensor 203 are respectively disposed on a left side and a right side of the longitudinal central axis. A distance between the first distance sensor 202 and the longitudinal central axis may be equal to a distance between the second distance sensor 203 and the longitudinal central axis.

The first distance sensor 202 may be disposed on the left side of the longitudinal central axis, and configured to measure a distance between a left eyeball and the first lens 2013. The first distance sensor 202 may be a distance sensor that measures a distance with relatively high precision, namely, a high-precision distance sensor, for example, a laser distance sensor, an infrared distance sensor, or a microwave distance sensor. The second distance sensor 203 may be disposed on the right side of the longitudinal central axis, and configured to measure a distance between a right eyeball and the second lens 2014. The second distance sensor 203 may also be a high-precision distance sensor, for example, a laser distance sensor, an infrared distance sensor, or a microwave distance sensor.

For details about a specific manner of disposing the first distance sensor 202 and the second distance sensor 203 on the display device body 201, refer to the following two designs.

Figure 3:
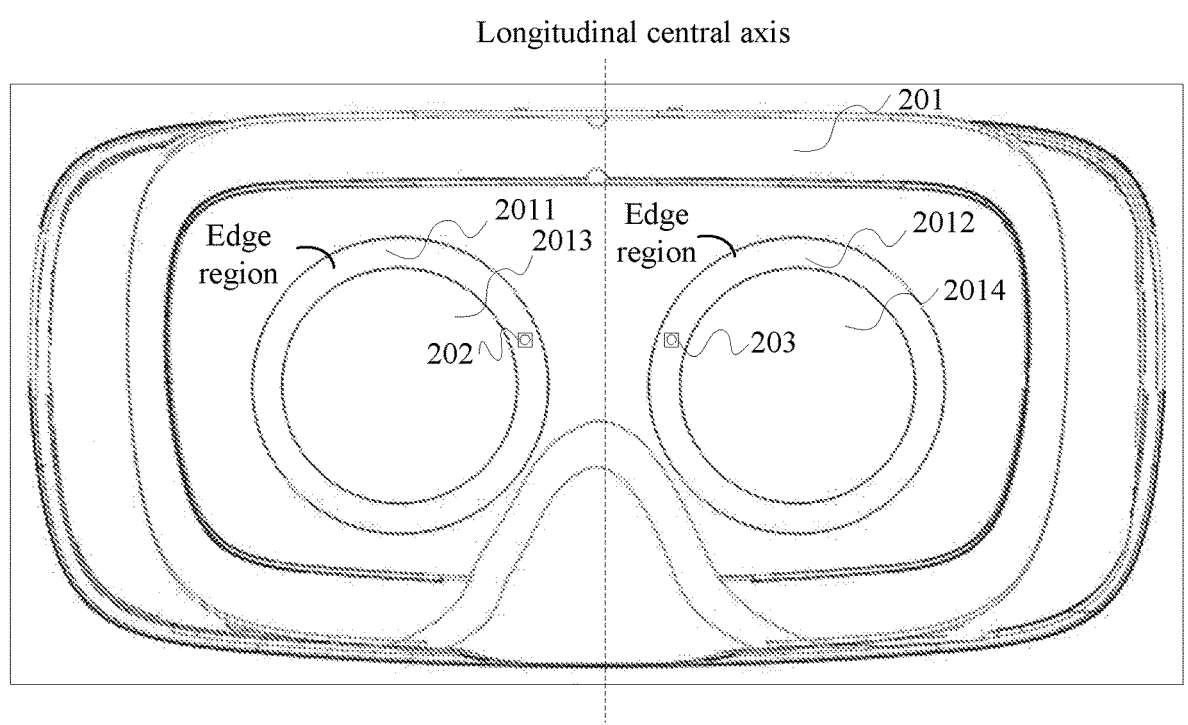
FIG. 3 is a schematic structural diagram of a display device according to an embodiment of this disclosure.

In a first possible design, referring to FIG. 3, the first distance sensor 202 is disposed in the edge region at the first end of the first lens barrel 2011, and the second distance sensor 203 is disposed in the edge region at the first end of the second lens barrel 2012.

In this design, the two distance sensors are separately disposed in the edge regions of the two lens barrels. A distance between the first distance sensor 202 and a lens center of the first lens 2013 is equal to a radius of the first lens 2013, and a distance between the second distance sensor 203 and a lens center of the second lens 2014 is equal to a radius of the second lens 2014.

The first distance sensor 202 may be disposed at any position in the edge region at the first end of the first lens barrel 2011, and the second distance sensor 203 may be disposed at any position in the edge region at the first end of the second lens barrel 2012, provided that it is ensured that the first distance sensor 202 and the second distance sensor 203 are symmetrically disposed relative to the longitudinal central axis.

In this design, the following two specific manners are provided to ensure that a distance measured by a distance sensor has relatively high accuracy.

In a manner 1, the first distance sensor 202 is disposed at an intersecting point that is close to the longitudinal central axis in two intersecting points of the edge region at the first end of the first lens barrel 2011 and a traverse central axis of the display device body 201, and the second distance sensor 203 is disposed at an intersecting point that is close to the longitudinal central axis in two intersecting points of the edge region at the first end of the second lens barrel 2012 and the traverse central axis of the display device body 201.

Figure 4:
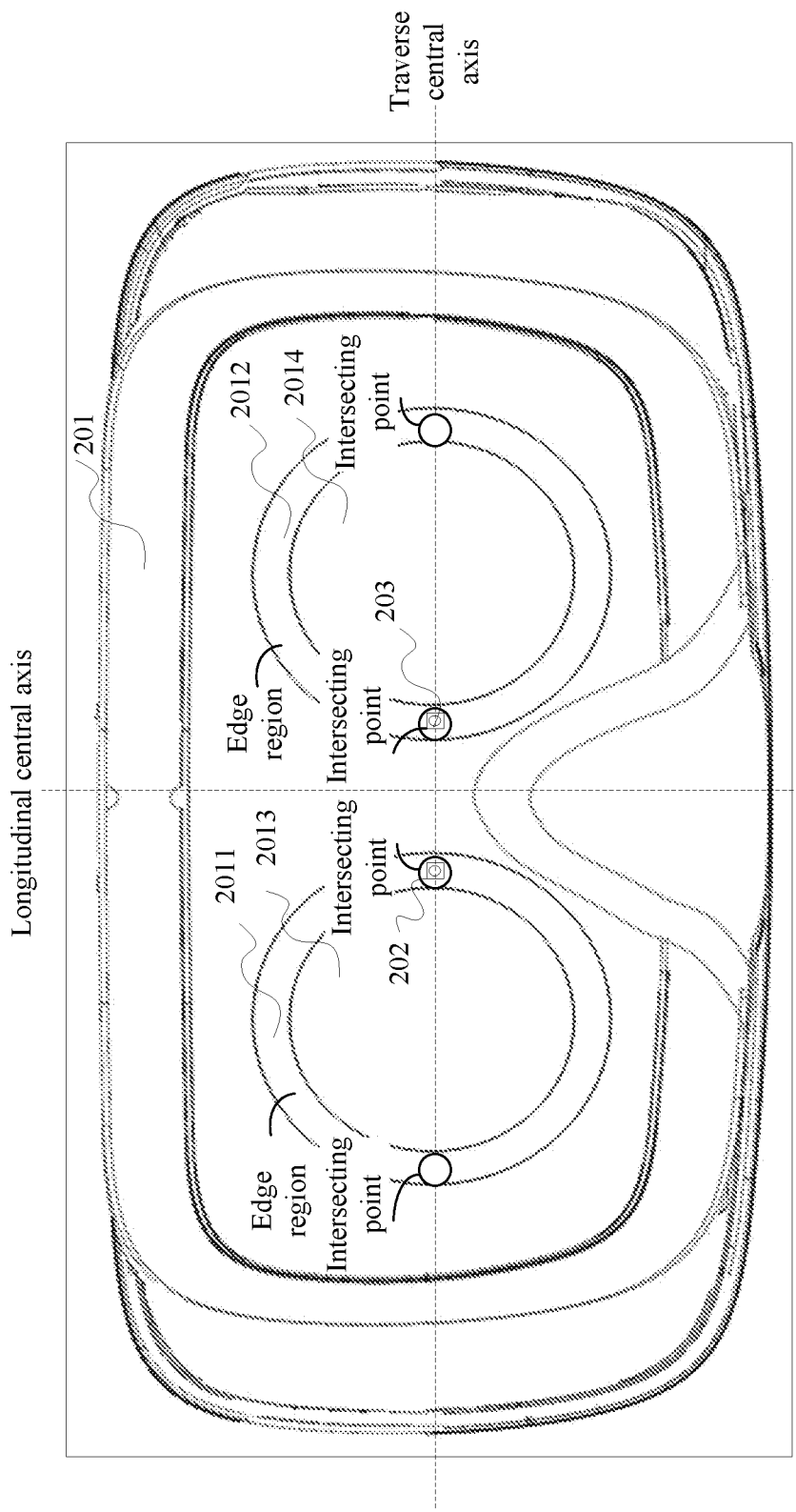
FIG. 4 is a schematic structural diagram of a display device according to an embodiment of this disclosure.

Referring to FIG. 4, the edge region at the first end of the first lens barrel 2011 and the traverse central axis have two intersecting points. The first distance sensor 202 may be disposed at an intersecting point that is close to the longitudinal central axis in the two intersecting points, and the first distance sensor 202 may be disposed at a position that is closest to the longitudinal central axis in all positions in the edge region at the first end of the first lens barrel 2011. Likewise, the edge region at the first end of the second lens barrel 2012 and the traverse central axis also have two intersecting points. The second distance sensor 203 may be disposed at an intersecting point that is close to the longitudinal central axis in the two intersecting points, and the second distance sensor 203 may be disposed at a position that is closest to the longitudinal central axis in all positions in the edge region at the first end of the second lens barrel 2012.

When the display device is worn normally, the first distance sensor 202 is located right ahead of an inner eye corner of the left eye of the user, and the measured distance is actually a distance between the inner eye corner of the left eye and the first distance sensor 202. Because a center of the first distance sensor 202 is located on a same vertical plane as the lens center of the first lens 2013, and the inner eye corner of the left eye is located on a same vertical plane as a pupil center of the left eye, the distance measured by the first distance sensor 202 is a distance between the pupil center of the left eye and the lens center of the first lens 2013. Likewise, the second distance sensor 203 is located right ahead of an inner eye corner of the right eye of the user, and measures a distance between the inner eye corner of the right eye and the second distance sensor 203. Because a center of the second distance sensor 203 is located on a same vertical plane as the center of the second lens 2014, and the inner eye corner of the right eye is located on a same vertical plane as a pupil center of the right eye, the distance measured by the second distance sensor 203 is a distance between the pupil center of the right eye and the lens center of the second lens 2014.

Based on this disposing manner, it can be ensured that the distance measured by the first distance sensor 202 is the accurate distance between the left eyeball and the first lens 2013, and that the distance measured by the second distance sensor 203 is the accurate distance between the right eyeball and the second lens 2014. In this way, when a position of a lens is adjusted based on such an accurate distance, a distance between the first lens 2013 and the second lens 2014 quite matches an interpupillary distance of the user, thereby ensuring a clear watching effect. In addition, for users who have different depths of eye sockets, a distance measured by any distance sensor is actually a distance between an inner eye corner and the distance sensor, and the distance is not affected by the depths of the eye sockets. Therefore, when a user who has relatively deep eye sockets wears the display device, a case in which the distance sensor measures a relatively long distance, that is, the distance is greater than an actual distance between an eyeball and a lens, is avoided, and when a user who has relatively shallow eye sockets wears the display device, a case in which the distance sensor measures a relatively short distance, that is, the distance is less than an actual distance between an eyeball and a lens, is also avoided.

In a manner 2, the first distance sensor 202 is disposed on a first vertical line, and the second distance sensor 203 is disposed on a second vertical line.

Figure 5:
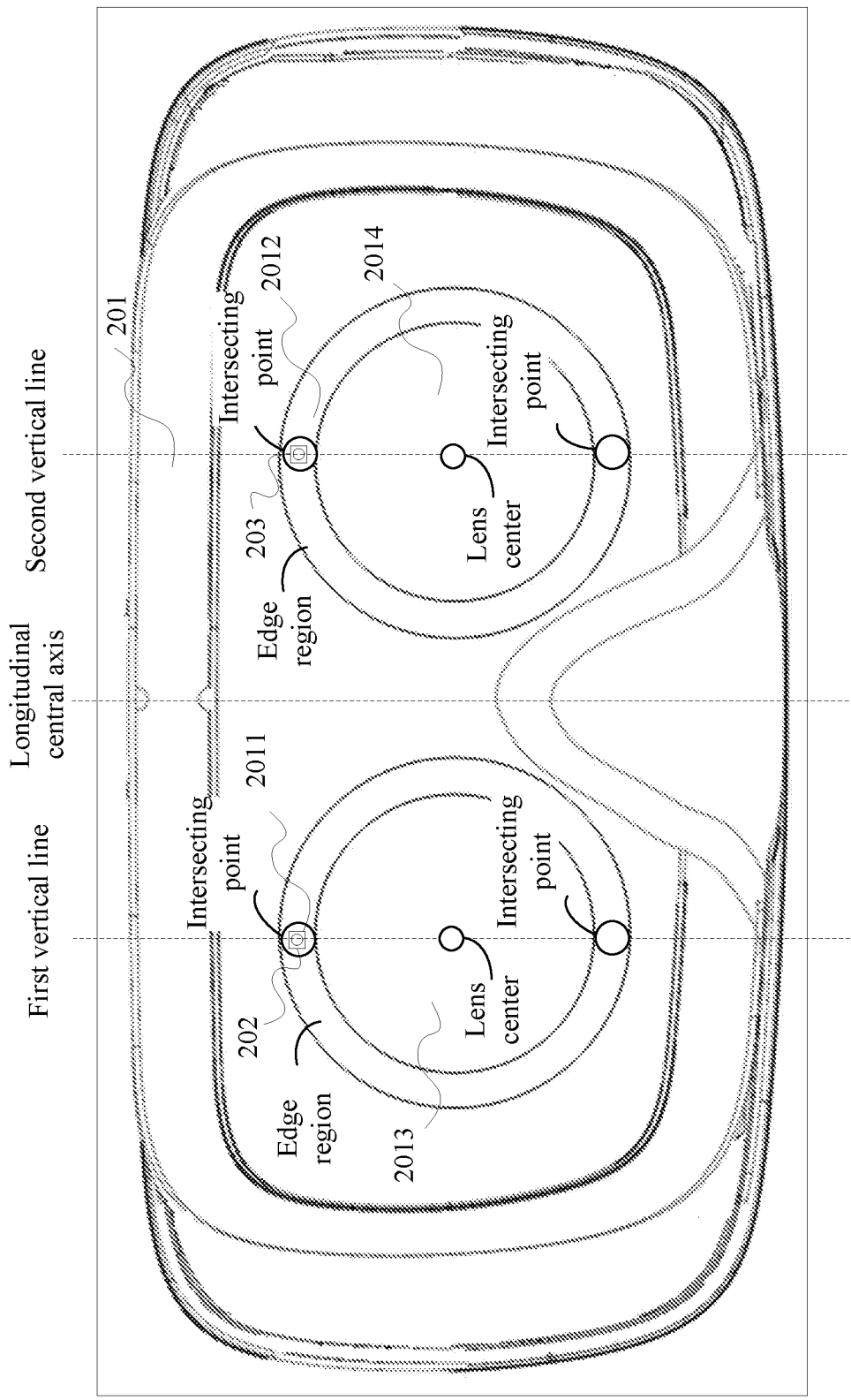
FIG. 5 is a schematic structural diagram of a display device according to an embodiment of this disclosure.

Referring to FIG. 5, the first vertical line is a straight line that is parallel to the longitudinal central axis and that is through the lens center of the first lens 2013. The first vertical line and the edge region at the first end of the first lens barrel 2011 have two intersecting points. The first distance sensor 202 may be disposed at an upper intersecting point in the two intersecting points. In an embodiment, the first distance sensor 202 may be disposed at a position right above the lens center of the first lens 2013, where a distance from the first distance sensor 202 to the lens center is equal to a lens radius. Alternatively, the first distance sensor 202 may be disposed at a lower intersecting point in the two intersecting points. In an embodiment, the first distance sensor may be disposed at a position right below the lens center of the first lens 2013, where a distance from the first distance sensor to the lens center is equal to the lens radius.

Likewise, the second vertical line is a straight line that is parallel to the longitudinal central axis and that is through the lens center of the second lens 2014. The second vertical line and the edge region at the first end of the second lens barrel 2012 also have two intersecting points. The first distance sensor 202 may be disposed at an upper intersecting point in the two intersecting points, or disposed at a lower intersecting point in the two intersecting points.

Figure 6:
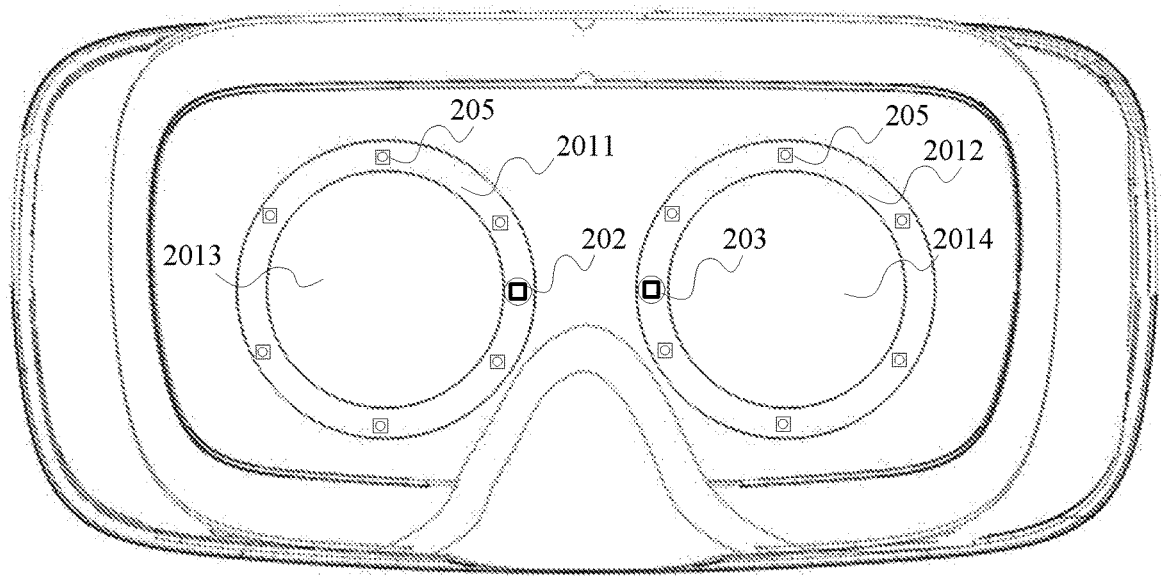
FIG. 6 is a schematic structural diagram of a display device according to an embodiment of this disclosure.

It should be noted that, referring to FIG. 6, the display device body 201 may further include LED units 205. The two distance sensors may be actually disposed on the LED units 205. An LED unit 205 may be disposed in the edge region at the first end of the first lens barrel 2011. The LED unit 205 includes a plurality of LEDs. The plurality of LEDs form an LED ring that is centered at the lens center of the first lens 2013 and that uses the radius of the first lens 2013 as a radius. The first distance sensor 202 may be disposed on the LED ring. Likewise, an LED unit 205 may also be disposed in the edge region at the first end of the second lens barrel 2012. The second distance sensor 203 may be disposed on the LED unit 205 on the second lens barrel 2012.

In a second possible design, the first distance sensor 202 is disposed on an outer side of the edge region at the first end of the first lens barrel 2011, and the second distance sensor 203 is disposed on an outer side of the edge region at the first end of the second lens barrel 2012.

Figure 7:
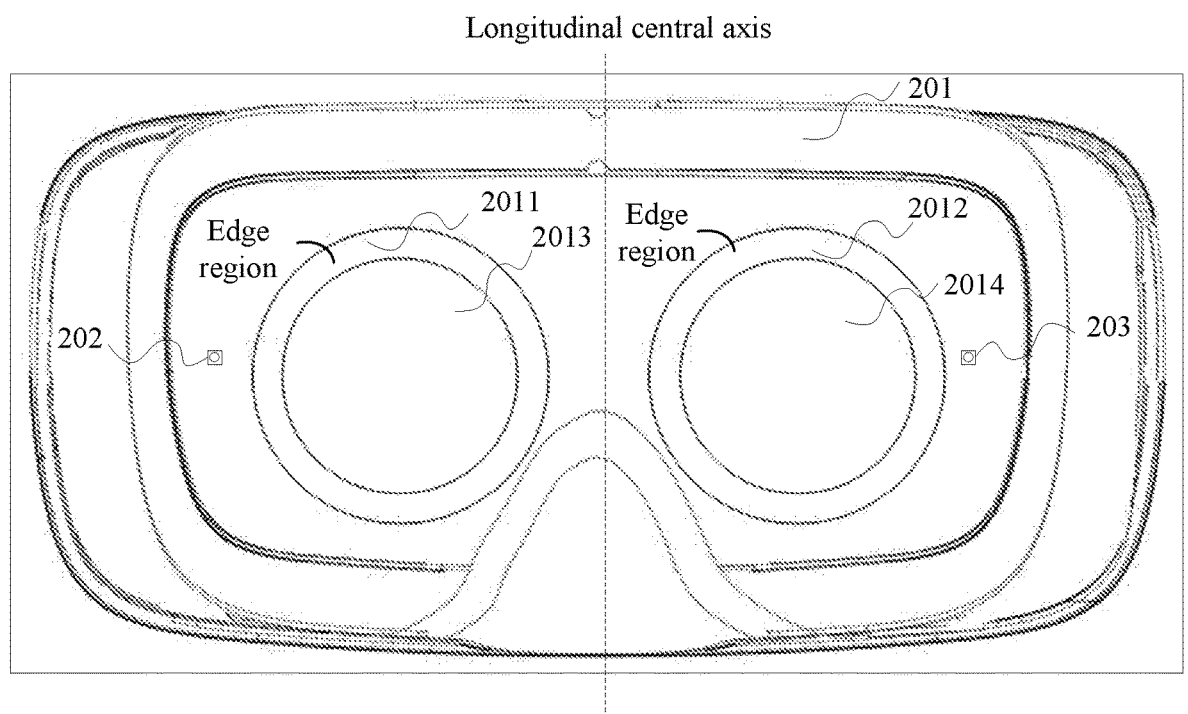
FIG. 7 is a schematic structural diagram of a display device according to an embodiment of this disclosure.

In this design, referring to FIG. 7, the two distance sensors are separately disposed around the edge regions of the two lens barrels. A distance between the first distance sensor 202 and a lens center of the first lens 2013 is greater than a radius of the first lens 2013, and a distance between the second distance sensor 203 and a lens center of the second lens 2014 is greater than a radius of the second lens 2014.

Figure 8:
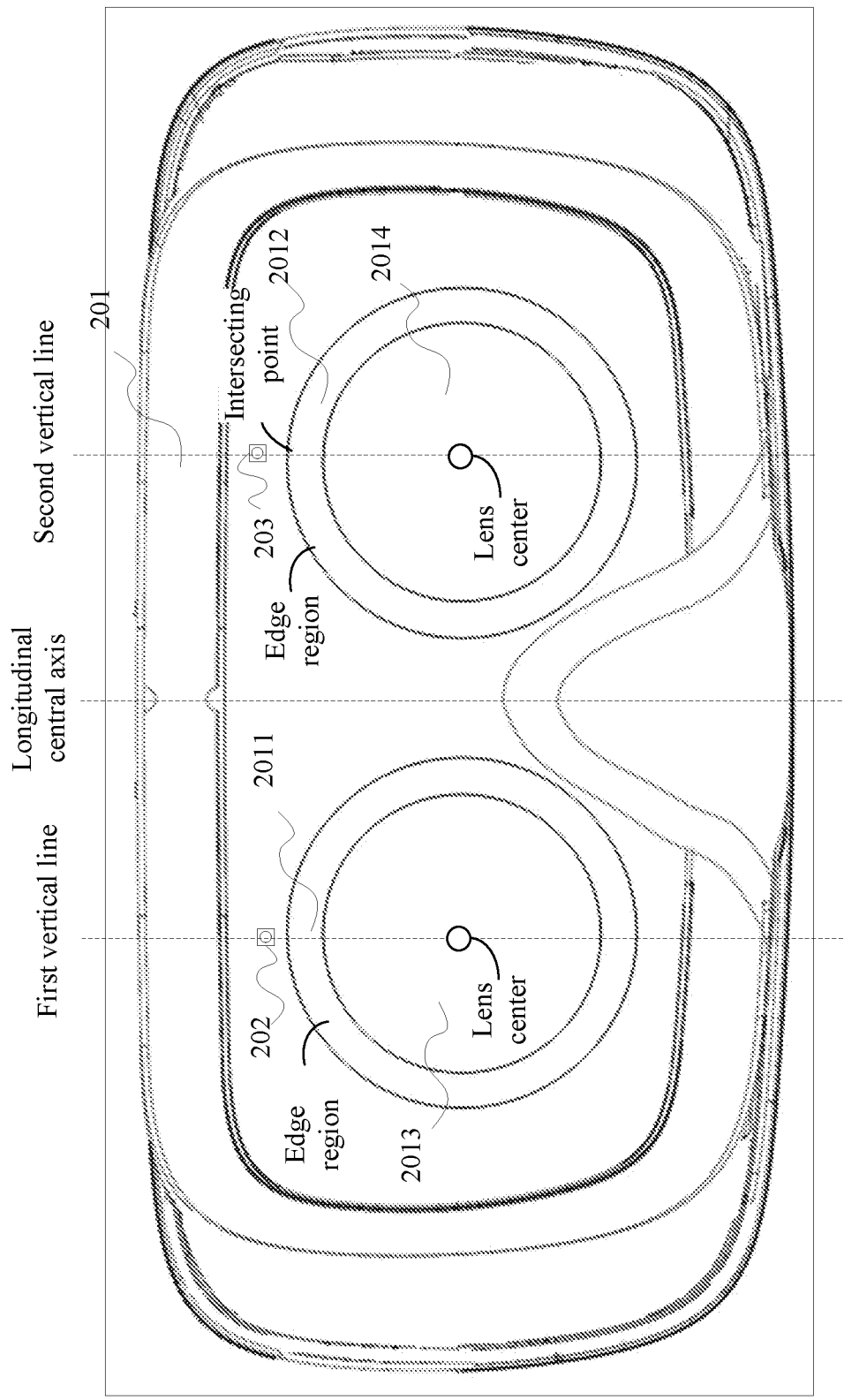
FIG. 8 is a schematic structural diagram of a display device according to an embodiment of this disclosure.

Optionally, referring to FIG. 8, the first distance sensor 202 may be disposed on a first vertical line. In an embodiment, the first distance sensor 202 may be disposed at any position right above the lens center of the first lens 2013, where a distance from the first distance sensor 202 to the lens center is greater than the lens radius, or disposed at any position right below the lens center of the first lens 2013, where a distance from the first distance sensor 202 to the lens center is greater than the lens radius. Likewise, the second distance sensor 203 may be disposed on a second vertical line. In an embodiment, the second distance sensor 203 may be disposed at any position right above the lens center of the second lens 2014, where a distance from the second distance sensor 203 to the lens center is greater than the lens radius, or disposed at any position right below the lens center of the second lens 2014, where a distance from the second distance sensor 203 to the lens center is greater than the lens radius.

Figure 9:
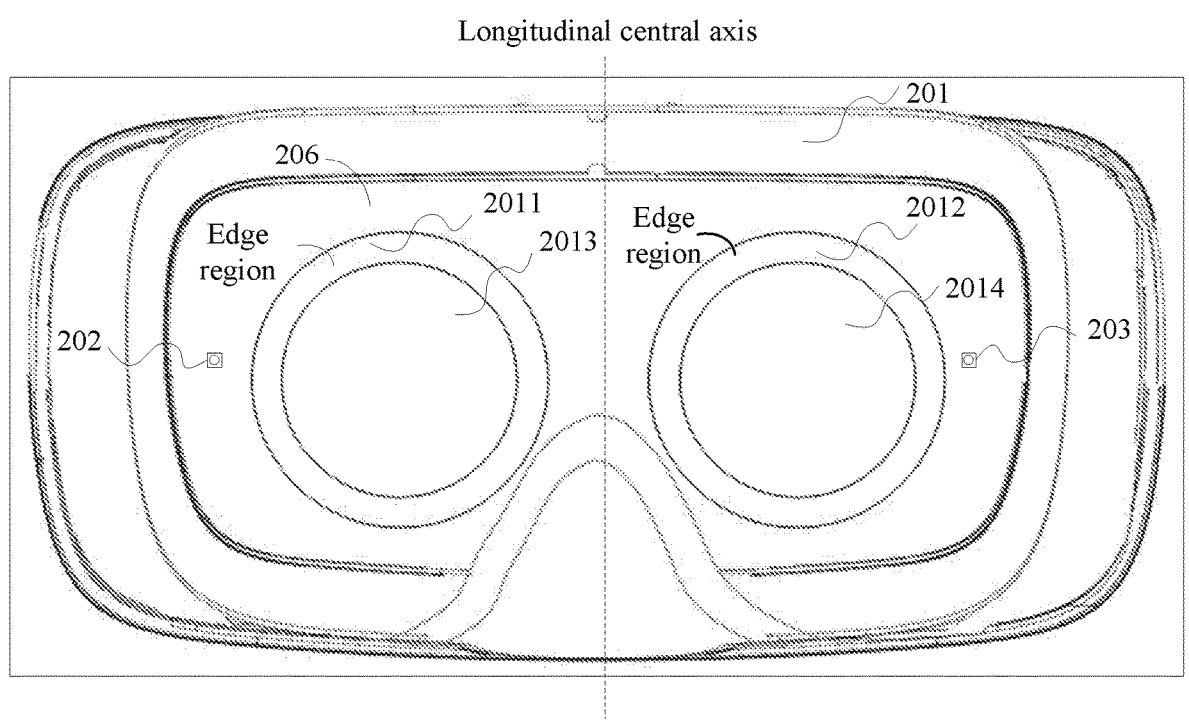
FIG. 9 is a schematic structural diagram of a display device according to an embodiment of this disclosure.

It should be noted that, referring to FIG. 9, the display device body 201 may further include a protection pad 206. The protection pad 206 is configured to protect the first lens barrel 2011 and the second lens barrel 2012, to prevent the first lens barrel 2011 and the second lens barrel 2012 from being damaged due to a bump, and ensure that the user has more comfortable wearing experience when the user wears the display device. The first distance sensor 202 and the second distance sensor 203 may be actually disposed on the protection pad 206.

(4) First camera module and second camera module.

The first camera module may be disposed in the first lens barrel 2011. A focal length and a direction of the first camera module are fixed. In this way, a left eyeball image of the user can be photographed, and the image can be transmitted to the processor. The second camera module may be disposed in the second lens barrel 2012. A focal length and a direction of the second camera module are fixed. In this way, a right eyeball image of the user can be photographed, and the image can be transmitted to the processor.

(5) First motor and second motor.

The first motor is configured to drive, under control of the processor, the first lens 2013 to move in order to adjust a position of the first lens 2013. The second motor is configured to drive, under control of the processor, the second lens 2014 to move in order to adjust a position of the second lens 2014. For details about a scheme of adjusting, by the processor, the positions of the first lens 2013 and the second lens 2014, refer to the following embodiment shown in FIG. 10.

(6) Display screen.

The display screen is configured to display an image, to present a virtual or augmented world before eyes of the user. The display screen may be a thin film transistor liquid crystal display (LCD) screen or another type of screen.

In related technologies, only one distance sensor is disposed on the display device, and configured to detect an obstacle in a specified range, to detect whether a user has worn the display device such that the processor determines, based on a detection result, whether to start the display device. After the display device is started, the processor obtains an interpupillary distance based only on photographed pupil images, and further adjusts a position of a lens based on the interpupillary distance. The interpupillary distance is affected by a distance between a pupil and the display device, and has relatively low precision. Consequently, after the position of the lens is adjusted, a clear watching effect probably cannot be achieved.

According to the display device provided in this embodiment, two distance sensors are disposed on the display device body, the first distance sensor measures the distance between the left eyeball and the first lens, and the second distance sensor measures the distance between the right eyeball and the second lens such that after a left pupil image and a right pupil image are separately normalized based on the two distances, impact of a distance between a pupil and the display device can be canceled. This helps obtain a high-precision interpupillary distance, and after a position of a lens is adjusted based on the high-precision interpupillary distance, a clear watching effect can be achieved.

Further, the first distance sensor may be disposed at the intersecting point that is close to the longitudinal central axis in the two intersecting points of the edge region at the first end of the first lens barrel and the traverse central axis of the display device body. The second distance sensor may be disposed at the intersecting point that is close to the longitudinal central axis in the two intersecting points of the edge region at the first end of the second lens barrel and the traverse central axis of the display device body. In this case, the distances measured by the first distance sensor and the second distance sensor are actually the distances between the inner eye corners and the corresponding distance sensors. This ensures that the measured distances are not affected by the different depths of the eye sockets of the users, and improves accuracy of the measured distances.

In an example embodiment, a computer readable storage medium, for example, a memory including an instruction, is further provided. The instruction may be executed by a processor in an electronic device, to perform a method for adjusting image presence on a display device in the following embodiment. For example, the computer readable storage medium may be a read-only memory (ROM), a random-access memory (RAM), a compact disc-ROM (CD-ROM), a magnetic tape, a floppy disk, an optical data storage device, or the like.

Figure 10:
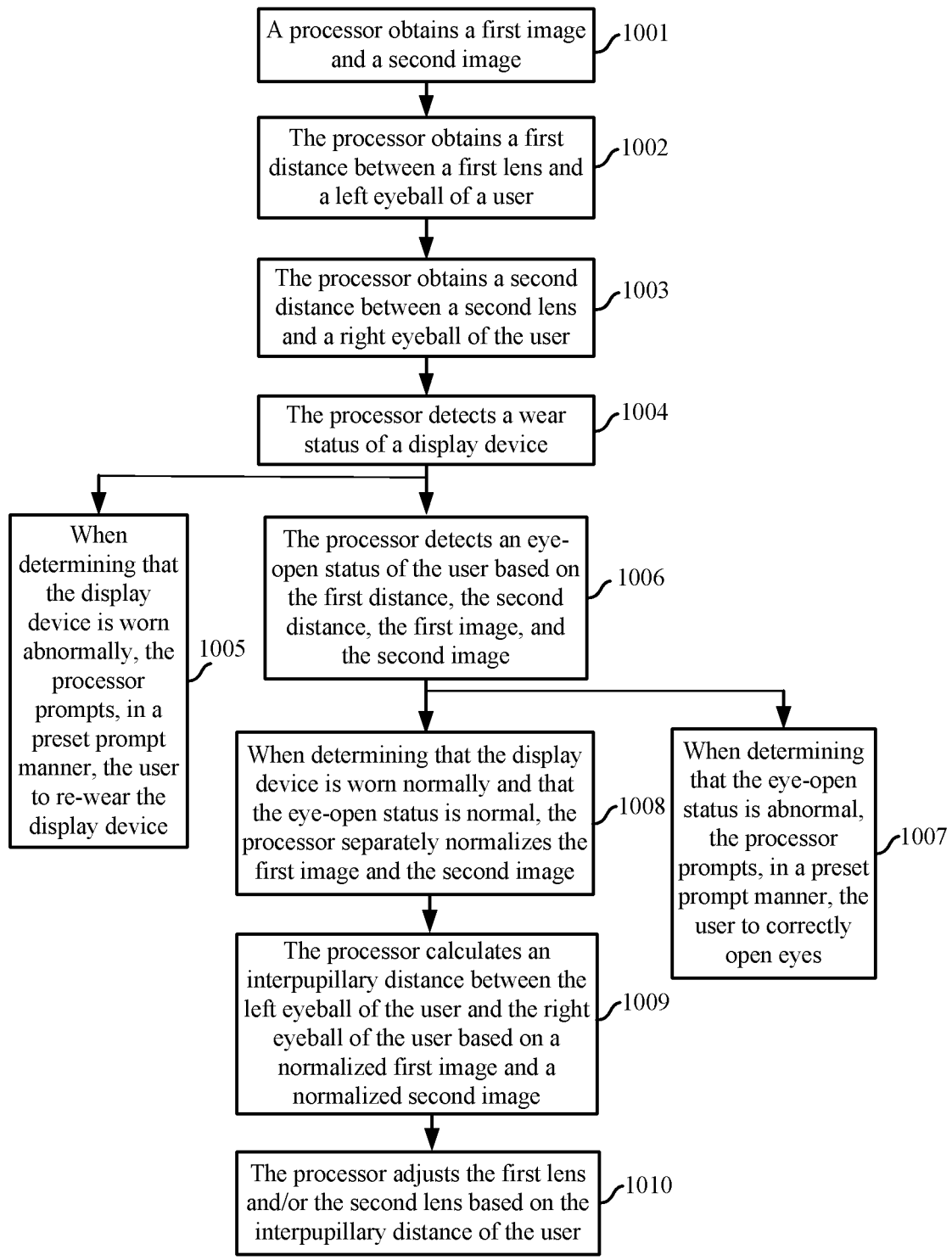
FIG. 10 is a flowchart of a method for adjusting image presence on a display device according to an embodiment of this disclosure.

FIG. 10 is a flowchart of a method for adjusting image presence on a display device according to an example embodiment. The method is performed by the processor in the display device described in the foregoing embodiments. As shown in FIG. 10, the following steps are included.

1001. The processor obtains a first image and a second image.

This embodiment is described using an example in which an image including a left eyeball of a user is referred to as a first image, and an image including a right eyeball of the user is referred to as a second image. When receiving a photographing instruction, the processor may photograph the left eyeball of the user using a first camera module, to obtain the first image, and photograph the right eyeball of the user using a second camera module, to obtain the second image. The photographing instruction may be triggered by an operation of wearing the display device, or triggered by an operation of starting the display device.

Optionally, before obtaining the first image and the second image, the display device may play a virtual perspective image, to guide a sight of the user towards a direct front direction in order to ensure that both a left pupil and a right pupil of the user directly face the display device.

1002. The processor obtains a first distance between a first lens and the left eyeball of the user.

1003. The processor obtains a second distance between a second lens and the right eyeball of the user.

The processor may measure a distance between the first lens and the left eyeball of the user using a first distance sensor, to obtain the first distance, and measure a distance between the second lens and the right eyeball of the user using a second distance sensor, to obtain the second distance. The first lens is a lens that is closest to the left eyeball of the user in all lenses of the display device, and the second lens is a lens that is closest to the right eyeball of the user in all the lenses of the display device. For details about specific positions of the first lens and the second lens, refer to the foregoing embodiments in FIG. 2 to FIG. 9.

1004. The processor detects a wear status of the display device.

The processor may detect the wear status of the display device based on the first distance and the second distance. For details, refer to the following first possible design. Alternatively, the processor may detect the wear status of the display device based on the first image and the second image. For details, refer to the following second possible design or third possible design.

In the first possible design, the processor may calculate a difference between the first distance and the second distance, and when the difference is less than a first preset difference, determine that the display device is worn normally.

After calculating the difference between the first distance and the second distance, the processor may determine whether the difference is less than the first preset difference, to determine whether the display device is worn normally. The first preset difference is used to indicate a maximum difference between the first distance and the second distance when the display device is worn normally, and the first preset difference may be pre-stored in the display device.

When the difference is less than the first preset difference, it may be considered that the first distance approaches the second distance. In other words, the distance between the left eyeball and the first lens is approximately equal to the distance between the right eyeball and the second lens. A direction of a line joining the two lenses is roughly parallel to a direction of a line joining two eyes. In other words, the two lenses are located on a same horizontal line. In this case, it may be determined that the display device is worn normally.

When the difference is not less than the first preset difference, it may be considered that the first distance and the second distance differ greatly. In other words, the distance between the left eyeball and the first lens and the distance between the right eyeball and the second lens differ greatly. An offset occurs between the direction of the line joining the two lenses and the direction of the line joining the two eyes. In other words, the two lenses are not located on a same horizontal line. In this case, it may be determined that the display device is worn aslant. When the first distance is greater than the second distance, and the difference is not less than the first preset difference, it indicates a slant case in which the first lens is in front and the second lens is at back. When the first distance is less than the second distance, and the difference is not less than the first preset difference, it indicates a slant case in which the first lens is at back and the second lens is in front.

In the second possible design, when point coordinates of a pupil center in the first image belong to a preset range of the first image, and point coordinates of a pupil center in the second image belong to a preset range of the second image, the processor determines that the display device is worn normally.

This design may include the following step 1 to step 4.

Step 1. Obtain the point coordinates of the pupil centers in the two images.

After obtaining the first image, the processor may establish a coordinate system for the first image, and perform image recognition on the first image to recognize a position of the pupil center in the coordinate system of the first image in order to obtain the point coordinates of the pupil center in the coordinate system, that is, point coordinates of a left pupil center. Likewise, after obtaining the second image, the processor may establish a coordinate system for the second image, and perform image recognition on the second image to recognize a position of the pupil center in the coordinate system of the second image in order to obtain the point coordinates of the pupil center in the coordinate system, that is, point coordinates of a right pupil center.

Step 2. Determine whether the point coordinates of the left pupil center belong to the preset range of the first image, and when the point coordinates of the left pupil center belong to the preset range of the first image, perform step 3, or when the point coordinates of the left pupil center do not belong to the preset range of the first image, determine that the display device is worn abnormally.

After obtaining the point coordinates of the pupil center in the first image, the processor may obtain the preset range of the first image, and determine whether the point coordinates belong to the preset range of the first image. When the point coordinates of the pupil center in the first image belong to the preset range of the first image, it indicates that the position of the left pupil center is normal. In other words, the display device is worn normally for the left eye. When the point coordinates of the pupil center in the first image do not belong to the preset range of the first image, it indicates that the left pupil center is not located at a correct position. In other words, the display device is worn abnormally for the left eye. In this case, the processor may determine that the display device is worn aslant. The preset range of the first image is used to indicate a range in which the point coordinates of the pupil center in the photographed image of the left eyeball fall when the display device is worn normally. The preset range of the first image may be pre-stored in the display device.

In a possible design, determining whether the point coordinates of the pupil center in the first image belong to the preset range of the first image may be implemented by determining whether the point coordinates meet the following formula $$-\frac{W}{2} < x1 < \frac{W}{2};$$
$$-\frac{W}{2} < y1 < \frac{W}{2};$$

where x1 indicates a horizontal coordinate of the point coordinates of the pupil center in the first image, y1 indicates a vertical coordinate of the point coordinates of the pupil center in the first image, and a value of W may be determined according to an actual precision requirement.

Step 3. Determine whether the point coordinates of the right pupil center belong to the preset range of the second image, and when the point coordinates of the right pupil center belong to the preset range of the second image, perform step 4, or when the point coordinates of the right pupil center do not belong to the preset range of the second image, determine that the display device is worn abnormally.

After obtaining the point coordinates of the pupil center in the second image, the processor may obtain the preset range of the second image, and determine whether the point coordinates belong to the preset range of the second image. When the point coordinates of the pupil center in the second image belong to the preset range of the second image, it indicates that the position of the right pupil center is normal. In other words, the display device is worn normally for the right eye. When the point coordinates of the pupil center in the second image do not belong to the preset range of the second image, it indicates that the right pupil center is not located at a correct position. In other words, the display device is worn abnormally for the right eye. In this case, the processor may determine that the display device is worn aslant. The preset range of the second image is used to indicate a range in which the point coordinates of the pupil center in the photographed image of the right eyeball fall when the display device is worn normally. The preset range of the second image may be pre-stored in the display device.

In a possible design, determining whether the point coordinates of the pupil center in the second image belong to the preset range of the second image may be implemented by determining whether the point coordinates meet the following formula $$-\frac{W}{2} < x2 < \frac{W}{2};$$
$$-\frac{W}{2} < y2 < \frac{W}{2};$$

where x2 indicates a horizontal coordinate of the point coordinates of the pupil center in the second image, y2 indicates a vertical coordinate of the point coordinates of the pupil center in the second image, and a value of W may be determined according to an actual precision requirement.

Step 4. Determine that the display device is worn normally.

In an embodiment, when the point coordinates of the pupil center in the first image belong to the preset range of the first image, and the point coordinates of the pupil center in the second image belong to the preset range of the second image, that is, when the display device is worn normally for both the left eye and the right eye, the processor determines that the display device is worn normally.

In the third possible design, when a difference between a distance between point coordinates of a pupil center in the first image and a reference position in the first image, and a distance between point coordinates of a pupil center in the second image and a reference position in the second image is less than a second preset difference, the processor may determine that the display device is worn normally.

This design may further include the following step 1 to step 3.

Step 1. Obtain the distance between the point coordinates of the pupil center in the first image and the reference position in the first image.

The processor may establish a coordinate system for the first image, perform image recognition on the first image to recognize a position of the pupil center in the coordinate system of the first image in order to obtain the point coordinates of the pupil center in the coordinate system, that is, point coordinates of a left pupil center, and use any position in the coordinate system of the first image as the reference position, to obtain point coordinates of the reference position in the coordinate system and calculate a distance between the point coordinates of the left pupil center and the point coordinates of the reference position. The display device may use a center of the first image, namely, an origin of the coordinate system of the first image, as the reference position in the first image.

Step 2. Obtain the distance between the point coordinates of the pupil center in the second image and the reference position in the second image.

The processor may establish a coordinate system for the second image, perform image recognition on the second image to recognize a position of the pupil center in the coordinate system of the second image in order to obtain the point coordinates of the pupil center in the coordinate system, that is, point coordinates of a right pupil center, and use any position in the coordinate system of the second image as the reference position, to obtain point coordinates of the reference position in the coordinate system and calculate a distance between the point coordinates of the right pupil center and the point coordinates of the reference position. The display device may use a center of the second image, namely, an origin of the coordinate system of the second image, as the reference position in the second image.

It should be noted that, in this design, it is required that the point coordinates of the reference position in the first image be the same as the point coordinates of the reference position in the second image. In an embodiment, if (M, N) in the coordinate system of the first image is used as the reference position in the first image, (M, N) in the coordinate system of the second image also needs to be used as the reference position in the second image, to ensure that a subsequently calculated difference can correctly reflect the wear status of the display device.

Step 3. Calculate the difference between the two distances, determine whether the difference is less than the second preset difference, and when the difference is less than the second preset difference, determine that the display device is worn normally, or when the difference is not less than the second preset difference, determine that the display device is worn aslant.

The distance between the point coordinates of the pupil center in the first image and the reference position in the first image can reflect a relative position relationship between the point coordinates of the left pupil center and the reference position in the first image, the distance between the point coordinates of the pupil center in the second image and the reference position in the second image can reflect a relative position relationship between the point coordinates of the right pupil center and the reference position in the second image, and the point coordinates of the reference position in the first image are also the same as those of the reference position in the second image. Therefore, the difference between the two distances can reflect a position offset between the point coordinates of the left pupil center and the point coordinates of the right pupil center. If the difference is less than the second preset difference, it may be determined that a distance between the left pupil center and a longitudinal central axis is approximately equal to a distance between the right pupil center and the longitudinal central axis, and that a height of the left pupil center is approximately equal to a height of the right pupil center, and it may be determined that the display device is worn normally. If the difference is not less than the second preset difference, it indicates that a case in which the distance between the left pupil center and the longitudinal central axis is different from the distance between the right pupil center and the longitudinal central axis or a case in which the height of the left pupil center is different from the height of the right pupil center may occur, and it may be determined that the display device is worn aslant.

The second preset difference is used to indicate a maximum difference between the distance between the point coordinates of the pupil center in the first image and the reference position in the first image, and the distance between the point coordinates of the pupil center in the second image and the reference position in the second image. The second preset difference may be determined according to an actual precision requirement, and may be pre-stored in the display device.

1005. When determining that the display device is worn abnormally, the processor prompts, in a preset prompt manner, the user to re-wear the display device.

The preset prompt manner may include displaying a first prompt page, making first prompt voice, and the like. The first prompt page may include text information, picture information, and the like that are used to prompt to re-wear the display device. For example, the text information may be "A current wear manner is wrong. Please re-wear the device." The first prompt voice may be voice for prompting to re-wear the display device. After viewing the first prompt page or hearing the first prompt voice, the user can learn that the display device needs to be re-worn, and re-wear the display device. In this case, the display device performs step 1001 again.

1006. The processor detects an eye-open status of the user based on the first distance, the second distance, the first image, and the second image.

An interpupillary distance of the user needs to be calculated based on the first image and the second image subsequently. If the eye-open status of the user is abnormal, for example, if the user closes an eye during photographing, the interpupillary distance cannot be normally calculated. Therefore, the eye-open status of the user is first detected based on the first distance, the second distance, the first image, and the second image. When the eye-open status is abnormal, step 1007 is performed. When the eye-open status is normal, step 1008 is performed.

A specific process of detecting whether the eye-open status is normal may include the following step 1 to step 5.

Step 1. The processor calculates a ratio of a left pupil diameter to a preset pupil diameter, to obtain a first specified coefficient.

When the processor uses the second possible design or the third possible design in a process of performing step 1004, the processor performs image recognition on the first image. In a process of recognizing the first image, the processor may further recognize the left pupil diameter, and can directly obtain the left pupil diameter in this step. When the processor uses the first possible design in the process of performing step 1004, or does not recognize the left pupil diameter after using the second possible design or the third possible design, the processor needs to perform image recognition on the first image in this step, to obtain the left pupil diameter.

After obtaining the left pupil diameter, the processor obtains the preset pupil diameter, calculates the ratio of the left pupil diameter to the preset pupil diameter, and uses the ratio as the first specified coefficient. The preset pupil diameter is a pupil diameter detected when the distance between the first lens and the left eyeball of the user is a preset reference distance and the eye-open status is normal.

The preset pupil diameter may be pre-obtained by detecting sample images obtained when a plurality of sample users wear the display device, and a specific process of obtaining the preset pupil diameter may include the following three possible designs.

In a first possible design, when a distance between the first lens and a left eyeball of a sample user is the preset reference distance, and an eye-open status of the sample user is normal, sample images may be collected, to obtain a plurality of first image samples. A sample pupil diameter is obtained for each of first image samples. In this way, sample pupil diameters are obtained, a plurality of sample pupil diameters are obtained, and an average value of the plurality of sample pupil diameters is calculated, as the preset pupil diameter.

In a second possible design, when a distance between the second lens and a right eyeball of the sample user is the preset reference distance, and the eye-open status of the sample user is normal, sample images are collected, to obtain a plurality of second image samples. A sample pupil diameter is obtained for each of the plurality of second image samples. In this way, sample pupil diameters are obtained, and an average value of the plurality of sample pupil diameters is calculated, as the preset pupil diameter.

In a third possible design, a plurality of sample pupil diameters may be obtained based on a plurality of first image samples, a plurality of sample pupil diameters may be obtained based on a plurality of second image samples, and then an average value of these sample pupil diameters may be calculated, as the preset pupil diameter.

Step 2. The processor calculates a ratio of a right pupil diameter to the preset pupil diameter, to obtain a second specified coefficient.

When the processor uses the second possible design or the third possible design in a process of performing step 1004, the processor performs image recognition on the second image. In a process of recognizing the second image, the processor may further recognize the right pupil diameter, and can directly obtain the right pupil diameter in this step. When the processor uses the first possible design in the process of performing step 1004, or does not recognize the right pupil diameter after using the second possible design or the third possible design, the processor needs to perform image recognition on the second image in this step, to obtain the right pupil diameter.

Step 3. The processor calculates a ratio of the first distance to the preset reference distance, to obtain a first scaling coefficient, and calculates a ratio of the second distance to the preset reference distance, to obtain a second scaling coefficient.

After obtaining the first scaling coefficient and the second scaling coefficient, the processor may store the first scaling coefficient and the second scaling coefficient, to subsequently perform a normalization process based on the first scaling coefficient and the second scaling coefficient.

Step 4. The processor calculates a difference between the first scaling coefficient and the first specified coefficient, and calculates a difference between the second scaling coefficient and the second specified coefficient.

Optionally, the processor may calculate a difference by subtracting the first specified coefficient from the first scaling coefficient, or calculate a difference by subtracting the first scaling coefficient from the first specified coefficient, then calculate an absolute value of the obtained difference, and use the absolute value as the difference between the first scaling coefficient and the first specified coefficient. Likewise, the processor may calculate a difference by subtracting the second specified coefficient from the second scaling coefficient, or calculate a difference by subtracting the second scaling coefficient from the second specified coefficient, then calculate an absolute value of the obtained difference, and use the absolute value as the difference between the second scaling coefficient and the second specified coefficient.

Step 5. The processor separately determines whether each of the two differences is less than a third preset difference, and when any one of the differences is less than the third preset difference, determines that the eye-open status is abnormal, or when both the differences are less than the third preset difference, determines that the eye-open status is normal.

The processor may obtain the third preset difference, determine whether the difference between the first scaling coefficient and the first specified coefficient is less than the third preset difference, and determine whether the difference between the second scaling coefficient and the second specified coefficient is less than the third preset difference. When both the differences are less than the third preset difference, it indicates that both an eye-open status of the left eye and an eye-open status of the right eye are normal. In this case, the display device determines that the eye-open status is normal. The third preset difference is used to indicate a maximum difference between the first scaling coefficient and the first specified coefficient, or used to indicate a maximum difference between the second scaling coefficient and the second specified coefficient. The third preset difference may be determined according to a precision requirement, and may be pre-stored in the display device.

When the difference between the first scaling coefficient and the first specified coefficient is not less than the third preset difference, it can be learned that one of the following cases may occur. The left eye is closed, the left eye is half-closed, and so on. In other words, the eye-open status of the left eye is abnormal. In this case, the display device determines that the eye-open status is abnormal. When the difference between the second scaling coefficient and the second specified coefficient is not less than the third preset difference, it can be learned that one of the following cases may occur. The right eye is closed, the right eye is half-closed, and so on. In other words, the eye-open status of the right eye is abnormal. In this case, the display device determines that the eye-open status is abnormal.

1007. When determining that the eye-open status is abnormal, the processor prompts, in a preset prompt manner, the user to correctly open eyes.

The preset prompt manner may include displaying a second prompt page, making second prompt voice, and the like. The second prompt page may include text information, picture information, and the like that are used to prompt to correctly open eyes. For example, the text information may be "Please open two eyes and look straight ahead." The second prompt voice is voice for prompting to correctly open eyes. After viewing the second prompt page or hearing the second prompt voice, the user can learn that eyes need to be correctly opened.

It should be noted that sequences for performing a wear status detection process and performing an eye-open status detection process are not limited in this embodiment. In an embodiment, the wear status may be detected first, and then the eye-open status is detected when it is determined that the wear status is normal. When it is determined that the wear status is abnormal, no subsequent step needs to be performed, and the user is directly prompted to re-wear the display device. Alternatively, the eye-open status may be detected first, and then the wear status is detected when it is determined that the eye-open status is normal. When it is determined that the eye-open status is abnormal, no subsequent step needs to be performed, and the user is directly prompted to correctly open eyes.

1008. When determining that the display device is worn normally and that the eye-open status is normal, the processor separately normalizes the first image and the second image.

The normalization in this step means that sizes of images photographed at different distances are all adjusted to a size of an image photographed at the preset reference distance. The preset reference distance may be a distance of approximately 15 mm.

Specifically, if the display device calculates the first scaling coefficient and the second scaling coefficient in step 1005, the display device may obtain the first scaling coefficient and the second scaling coefficient in step 1008, normalize the first image based on the first scaling coefficient, and normalize the second image based on the second scaling coefficient.

For a specific process of normalizing the first image based on the first scaling coefficient, when the first scaling coefficient is greater than 1, that is, when the first distance is greater than the preset reference distance, it indicates that a distance between the left pupil and the display device is relatively long. In this case, a size of the obtained first image is actually relatively small, and the first scaling coefficient may be used as a magnification proportion of the first image. The first image is magnified proportionally, where a size of a magnified first image is equal to a product of the size of the first image and the first scaling coefficient, and the magnified first image may be used as a normalized first image.

Likewise, when the first scaling coefficient is less than 1, that is, when the first distance is less than the preset reference distance, it indicates that a distance between the left pupil and the display device is relatively short. In this case, a size of the obtained first image is actually relatively large, and the first scaling coefficient may be used as a reduction proportion of the first image. The first image is reduced proportionally, where a size of a reduced first image is equal to a product of the size of the first image and the first scaling coefficient, and the reduced first image may be used as a normalized first image.

For a specific process of normalizing the second image based on the second scaling coefficient, when the second scaling coefficient is greater than 1, that is, when the second distance is greater than the preset reference distance, it indicates that a distance between the right pupil and the display device is relatively long. In this case, a size of the obtained second image is actually relatively small, and the second scaling coefficient may be used as a magnification proportion of the second image. The second image is magnified proportionally, where a size of a magnified second image is equal to a product of the size of the second image and the second scaling coefficient, and the magnified second image may be used as a normalized second image.

Likewise, when the second scaling coefficient is less than 1, that is, when the second distance is less than the preset reference distance, it indicates that a distance between the right pupil and the display device is relatively short. In this case, a size of the obtained second image is actually relatively large, and the second scaling coefficient may be used as a reduction proportion of the second image. The second image is reduced proportionally, where a size of a reduced second image is equal to a product of the size of the second image and the second scaling coefficient, and the reduced second image may be used as a normalized second image.

First, it should be noted that distances between pupils of users and the display device may be different due to a wearing habit difference of the users, and consequently, sizes of first images and second images that are photographed at different distances are different. In this embodiment, the preset reference distance is set, the first scaling coefficient is calculated based on the preset reference distance and the first distance between the left eyeball and the first lens, and the first image is normalized using the first scaling coefficient. In this way, sizes of first images photographed at various first distances can be uniformly scaled to the size of the first image photographed at the preset reference distance, and impact of the first distance on the size of the first image is canceled. Likewise, the second scaling coefficient is calculated based on the preset reference distance and the second distance between the right eyeball and the second lens, and the second image is normalized using the second scaling coefficient. In this way, sizes of second images photographed at various second distances can be uniformly scaled to the size of the second image photographed at the preset reference distance, and impact of the second distance on the size of the second image is canceled.

In other words, a longer distance between the left pupil and the first lens indicates a smaller first image and a larger first scaling coefficient, namely, a larger magnification proportion of the first image. In this case, impact of a long distance is canceled, and it is ensured that the magnified first image is the first image photographed at the preset reference distance. A shorter distance between the left pupil and the first lens indicates a larger first image and a smaller first scaling coefficient, namely, a smaller reduction proportion of the first image. In this case, impact of a short distance is canceled, and it is ensured that the reduced first image is the first image photographed at the preset reference distance. Likewise, a longer distance between the right pupil and the second lens indicates a smaller second image and a larger second scaling coefficient, namely, a larger magnification proportion of the second image. In this case, impact of a long distance is canceled, and it is ensured that the magnified second image is the second image photographed at the preset reference distance. A shorter distance between the right pupil and the second lens indicates a larger second image and a smaller second scaling coefficient, namely, a smaller reduction proportion of the second image. In this case, impact of a short distance is canceled, and it is ensured that the reduced second image is the second image photographed at the preset reference distance.

Second, it should be noted that the step of detecting the wear status and the step of detecting the eye-open status are merely optional steps and may not need to be performed. In an embodiment, the processor may not need to perform step 1004 to step 1007, but directly normalize the first image and the second image after performing step 1001 to step 1003.

1009. The processor calculates an interpupillary distance between the left eyeball of the user and the right eyeball of the user based on the normalized first image and the normalized second image.

Step 1009 may include the following step 1 to step 4.

Step 1. Obtain point coordinates of a left pupil center in the normalized first image, obtain mapping point coordinates of a center of the first lens in the normalized first image, and calculate a difference between the point coordinates of the left pupil center and the mapping point coordinates, as a first difference.

Figure 11:
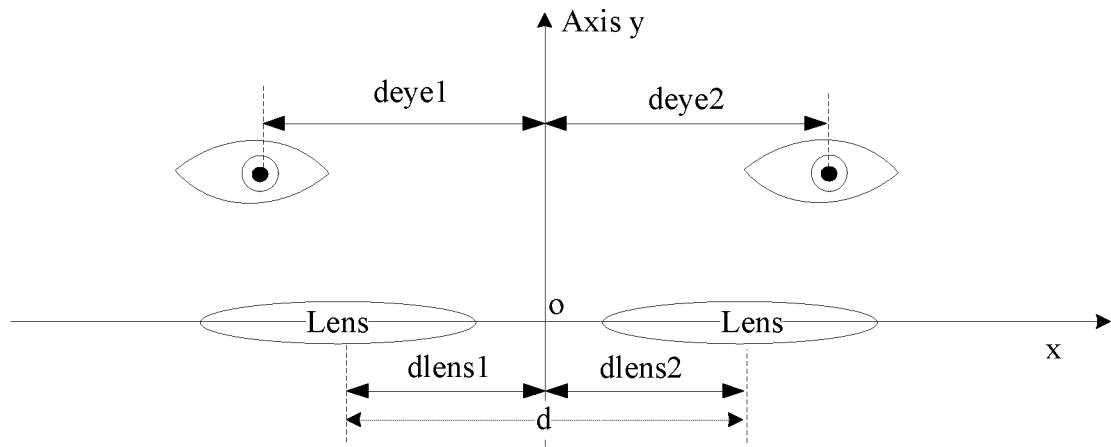
FIG. 11 is a schematic diagram of a method for adjusting image presence on a display device according to an embodiment of this disclosure.

For example, referring to FIG. 11, a midpoint between the first lens and the second lens may be used as an origin of a coordinate system, and the longitudinal central axis of the display device is used as an axis y of the coordinate system, to establish the coordinate system. In this case, an absolute value of a horizontal coordinate of any point in the normalized first image is a distance from the point to the longitudinal central axis. Then the left pupil in the normalized first image is detected, and the left pupil center is located. A position of the left pupil center in the normalized first image is converted into a position in the coordinate system, to obtain a distance deye1 between the point coordinates of the left pupil center and the axis y. Then a distance dlens1 between the mapping point coordinates of the lens center of the first lens and the axis y is calculated, and a difference $\delta1=deye1-dlens1$ between the two distances is calculated.

Step 2. Obtain point coordinates of a right pupil center in the normalized second image, obtain mapping point coordinates of a center of the second lens in the normalized second image, and calculate a difference between the point coordinates of the right pupil center and the mapping point coordinates, as a second difference.

A coordinate system may be established in a same manner. The right pupil in the normalized second image is detected, and the right pupil center is located. A position of the right pupil center in the normalized second image is converted into a position in the coordinate system, to obtain a distance deye2 between the point coordinates of the right pupil center and an axis y. Then a distance dlens2 between the mapping point coordinates of the lens center of the second lens and the axis y is calculated, and a difference $\delta2=deye2-dlens2$ between the two distances is calculated.

Step 3. Obtain a current distance between the center of the first lens and the center of the second lens.

Step 4. Calculate a sum of the current distance, the first difference, and the second difference, to obtain the interpupillary distance of the user.

Assuming that the current distance is d, the interpupillary distance=$d+\delta1+\delta2$.

It should be noted that impact caused by a value of the first distance has already been canceled for the normalized first image, and impact caused by a value of the second distance has already been canceled for the normalized second image, and the interpupillary distance calculated based on the normalized first image and the normalized second image is an accurate interpupillary distance.

1010. The processor adjusts the first lens and/or the second lens based on the interpupillary distance of the user.

For example, an adjustment direction of the first lens is referred to as a first adjustment direction, an adjustment distance of the first lens is referred to as a first adjustment distance, an adjustment direction of the second lens is referred to as a second adjustment direction, and an adjustment distance of the second lens is referred to as a second adjustment distance. A specific lens adjustment process may be as follows. In step 1 of step 1009, when the first difference is greater than 0, moving inwards may be used as the first adjustment direction, or when the first difference is less than 0, moving outwards may be used as the first adjustment direction, an absolute value of the first difference is used as the first adjustment distance, and the first lens is adjusted based on the first adjustment direction and the first adjustment distance. In step 2 of step 1007, when the second difference is greater than 0, moving inwards may be used as the second adjustment direction, or when the second difference is less than 0, moving outwards may be used as the second adjustment direction, an absolute value of the second difference is used as the second adjustment distance, and the second lens is adjusted based on the second adjustment direction and the second adjustment distance.

In this case, when the current distance is greater than the interpupillary distance, the first lens and/or the second lens move/moves inwards such that the current distance between the first lens and the second lens decreases, until the current distance is equal to the interpupillary distance. When the current distance is less than the interpupillary distance, the first lens and/or the second lens move/moves outwards such that the current distance between the first lens and the second lens increases, until the current distance is equal to the interpupillary distance. In this way, the current distance between the first lens and the second lens is equal to the interpupillary distance, to ensure an effect of clear image presence on the display device.

Optionally, in step 1 of step 1009, after obtaining the point coordinates of the left pupil center in the normalized first image, the display device may calculate the distance between the point coordinates and the longitudinal central axis of the display device. The distance is approximately equal to a distance between the left pupil center and a nose bridge of the user, and the distance may be used as a left pupillary distance. The display device separately determines a first adjustment direction and a first adjustment distance based on the left pupillary distance, and further adjusts the first lens. After obtaining the point coordinates of the right pupil center in the normalized second image, the display device may calculate the distance between the point coordinates and the longitudinal central axis of the display device. The distance is approximately equal to a distance between the right pupil center and the nose bridge of the user, and the distance may be used as a right pupillary distance. The display device separately determines a second adjustment direction and a second adjustment distance based on the right pupillary distance, and further adjusts the second lens. The left eye pupillary distance and the right pupillary distance are separately calculated such that the method provided in this embodiment is also applicable to special populations with a relatively large difference between a left pupillary distance and a right pupillary distance, thereby improving universality.

First, it should be noted that, after obtaining the interpupillary distance, the display device may store a correspondence between a user identity and the interpupillary distance such that when the user wears the display device next time, a position of a lens is directly adjusted based on the stored interpupillary distance, and the interpupillary distance does not need to be re-obtained. The display device may receive an input instruction when displaying a login page, obtain an entered user identity, and query a stored correspondence between the user identity and the interpupillary distance of the user based on the user identity. When the stored correspondence does not include the interpupillary distance, corresponding to the user identity, of the user, the interpupillary distance of the user is obtained using the foregoing method, and the correspondence between the user identity and the interpupillary distance of the user is further stored. When the stored correspondence includes the interpupillary distance, corresponding to the user identity, of the user, it indicates that the display device has already obtained the interpupillary distance of the user before. In this case, the interpupillary distance, corresponding to the user identity, of the user may be directly obtained from the correspondence, and the interpupillary distance of the user does not need to be re-obtained. This helps quickly obtain the interpupillary distance, quickly adjust the distance between the lenses, save time, and improve efficiency.

Second, it should be noted that a process of adjusting the first lens and/or the second lens by the processor may be actually implemented by a first motor and a second motor that are included in a display device body. After obtaining, through calculation, the first adjustment direction, the first adjustment distance, the second adjustment direction, and the second adjustment distance, the processor may transfer the first adjustment direction and the first adjustment distance to the first motor, and transfer the second adjustment direction and the second adjustment distance to the second motor. The first motor drives, based on the first adjustment direction and the first adjustment distance, the first lens to move left and right, and the second motor drives, based on the second adjustment direction and the second adjustment distance, the second lens to move left and right, to finally adjust the interpupillary distance.

In conclusion, an operation procedure of the method for adjusting image presence on a display device provided in this embodiment may be shown as follows, and include the following step S1 to step S4.

S1. The first camera module obtains a left eyeball image of the user, and the second camera module obtains a right eyeball image of the user.

S2. The first distance sensor measures a distance between a left eyeball of the user and the first lens, and normalizes, based on the distance, the left eyeball image obtained in step S1. The second distance sensor measures a distance between a right eyeball of the user and the second lens, and normalizes, based on the distance, the right eyeball image obtained in step S1.

S3. Detect a pupil of the user for a normalized left eyeball image in step S2, locate a left pupil center to obtain point coordinates of the left pupil center, and calculate an adjustment direction and an adjustment distance of the first lens based on a difference between the point coordinates of the left pupil center and mapping point coordinates of the lens center of the first lens in the image, detect a pupil of the user for a normalized right eyeball image in step S2, locate a right pupil center to obtain point coordinates of the right pupil center, and calculate an adjustment direction and an adjustment distance of the second lens based on a difference between the point coordinates of the right pupil center and mapping point coordinates of the lens center of the second lens in the image, and calculate a value of an interpupillary distance.

S4. Adjust the first lens and the second lens of the display device based on the interpupillary distance of the user that currently uses the display device.

According to the method provided in this embodiment, the first image and the second image are separately normalized based on the first distance between the first lens and the left eyeball and the second distance between the second lens and the right eyeball. For both the normalized first image and the normalized second image, impact caused by different distances between pupils of users and the display device is canceled. Therefore, the interpupillary distance calculated based on the normalized first image and the normalized second image does not have an error that is generated due to the different distances between the pupils of the users and the display device, and has relatively high precision. When a position of a lens is adjusted based on the interpupillary distance with such high precision, a clear watching effect can be achieved.

Further, the wear status of the display device is detected, and then a position of a lens is adjusted when the display device is worn normally in order to avoid a problem that an inaccurate interpupillary distance is measured because the display device is worn aslant.

Further, when it is determined that the display device is worn abnormally, the user is prompted in the preset prompt manner to re-wear the display device. This can guide the user to correctly wear the display device, and is more humanized.

Further, the eye-open status of the user is detected, and then a position of a lens is adjusted when the eye-open status is normal in order to avoid a problem that an inaccurate interpupillary distance is measured during image photographing due to a case in which the eye-open status is abnormal, for example, the user closes an eye.

Further, after the interpupillary distance is obtained through measurement, the correspondence between the user identity and the interpupillary distance of the user may be stored such that when the user wears the display device next time, the interpupillary distance, corresponding to the user identity, of the user may be directly obtained from the correspondence, and the interpupillary distance of the user does not need to be re-obtained. This helps quickly obtain the interpupillary distance, quickly adjust the distance between the lenses, save time, and improve efficiency.

Figure 12:
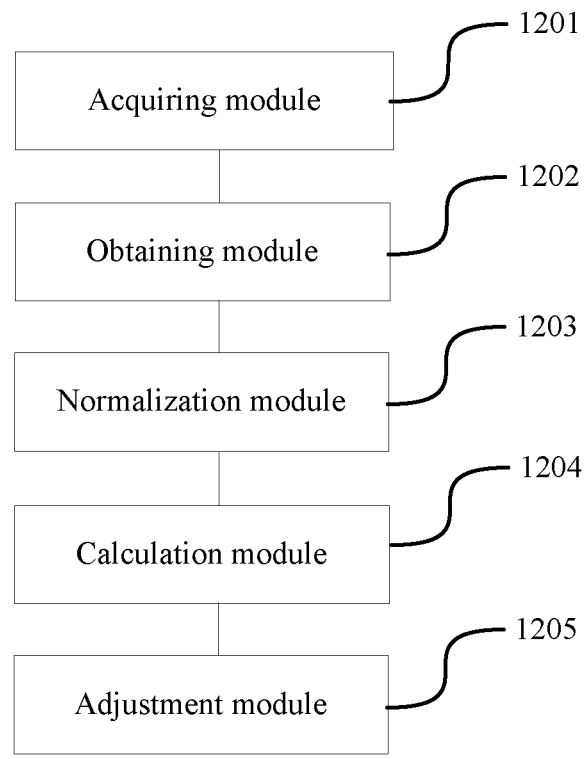
FIG. 12 is a block diagram of an apparatus for adjusting image presence on a display device according to an embodiment of this disclosure.

FIG. 12 is a schematic structural diagram of an apparatus for adjusting image presence on a display device according to an example embodiment. As shown in FIG. 12, the apparatus includes an acquiring module 1201, an obtaining module 1202, a normalization module 1203, a calculation module 1204, and an adjustment module 1205.

The acquiring module 1201 is configured to obtain a first image and a second image.

The obtaining module 1202 is configured to obtain a first distance and a second distance.

The normalization module 1203 is configured to normalize the first image and the second image.

The calculation module 1204 is configured to calculate an interpupillary distance.

The adjustment module 1205 is configured to adjust a first lens and/or a second lens based on the interpupillary distance.

In a possible design, the normalization module 1203 is configured to perform step 1008.

In a possible design, the apparatus further includes a wear status detection module configured to perform step 1004.

In a possible design, the apparatus further includes a prompt module configured to perform step 1005.

In a possible design, the apparatus further includes an eye-open status detection module configured to perform step 1006.

In a possible design, the apparatus further includes a storage module configured to store a correspondence between the user identity and the interpupillary distance of the user.

All the foregoing optional technical solutions may be combined in any manner, to form an optional embodiment of this disclosure. Details are not described herein.

It should be noted that, when the apparatus for adjusting image presence on a display device provided in the foregoing embodiment adjusts image presence on the display device, division of the foregoing function modules is only used as an example for description. During actual application, the foregoing functions may be allocated to and performed by different function modules as required. In an embodiment, an inner structure of the display device is divided into different function modules, to perform all or some of the foregoing described functions. In addition, the apparatus for adjusting image presence on a display device provided in the foregoing embodiment and the method embodiment for adjusting image presence on a display device belong to a same concept. For details about a specific implementation process, refer to the method embodiment. Details are not described herein again.

A person of ordinary skill in the art can understand that all or some of the steps of the embodiments may be implemented by hardware or a program instructing related hardware. The program may be stored in a computer readable storage medium. The storage medium may include a ROM, a magnetic disk, or a compact disc.

What is claimed is:

1. A display device, comprising:
    a display device body, comprising:
        a first lens barrel, comprising:
            a first end;
            a first lens coupled to the first end; and
            a first edge region;
        a second lens barrel, comprising:
            a second end;
            a second lens coupled to the second end; and
            a second edge region;
        a longitudinal central axis comprising:
            a first side; and
            a second side;
        a first distance sensor symmetrically disposed on the first side and configured to measure a first distance between a left eyeball and the first lens, wherein the first distance sensor is disposed in the first edge region;
        a second distance sensor symmetrically disposed on the second side and configured to measure a second distance between a right eyeball and the second lens, wherein the second distance sensor is disposed in the second edge region; and
        a traverse central axis, wherein the first edge region comprises a first intersecting point along the traverse central axis that is close to the longitudinal central axis and a second intersecting point along the traverse central axis, wherein the second edge region comprises a third intersecting point along the traverse central axis that is close to the longitudinal axis and a fourth intersecting point along the traverse central axis, wherein the first distance sensor is disposed at the first intersecting point, and wherein the second distance sensor is disposed at the third intersecting point.

2. The display device of claim 1, wherein the first lens barrel further comprises a first light-emitting diode (LED) disposed in the first edge region, and wherein the second lens barrel further comprises a second LED disposed in the second edge region.

3. The display device of claim 1, wherein the display device body further comprises:
    a first vertical line that is a straight line parallel to the longitudinal central axis and is through a lens center of the first lens; and
    a second vertical line that is a straight line parallel to the longitudinal central axis and is through a lens center of the second lens,
    wherein the first distance sensor is disposed on the first vertical line, and wherein the second distance sensor is disposed on the second vertical line.

4. The display device of claim 1, wherein the first lens barrel further comprises a first edge region, wherein the first edge region comprises a first outer side, wherein the second lens barrel further comprises a second edge region, wherein the second edge region comprises a second outer side, wherein the first distance sensor is disposed on the first outer side, and wherein the second distance sensor is disposed on the second outer side.

5. A method for adjusting image presence on a display device comprising:
    obtaining a first image comprising a left eyeball image of a user;
    obtaining a second image comprising a right eyeball image of the user;
    obtaining a first distance between a first lens and the left eyeball of the user, wherein the first lens is closer to the left eyeball of the user than a second lens;
    obtaining a second distance between the second lens and the right eyeball of the user, wherein the second lens is closer to the right eyeball of the user than the first lens;
    normalizing the first image based on the first distance and the second distance;
    normalizing the second image based on the first distance and the second distance;
    calculating an interpupillary distance between the left eyeball and the right eyeball based on a normalized first image and a normalized second image;
    adjusting the first lens or the second lens based on the interpupillary distance of the user;
    obtaining a pupil image with a preset size, wherein a preset reference distance is either between the first lens and the left eyeball of the user, or between the second lens and the right eyeball of the user;
    calculating a ratio of the first distance to the preset reference distance to obtain a first scaling coefficient;
    calculating a ratio of the second distance to the preset reference distance to obtain a second scaling coefficient;
    scaling the first image using the first scaling coefficient; and
    scaling the second image using the second scaling coefficient.

6. The method for adjusting image presence on the display device of claim 5, further comprising:
    detecting a wear status of the display device based on the first distance and either the second distance or the second image;
    normalizing the first image based on the first distance and the second distance; and
    normalizing the second image based on the first distance and the second distance when the display device is worn normally.

7. The method for adjusting image presence on the display device of claim 6, further comprising:
    calculating a difference between the first distance and the second distance; and
    determining that the display device is worn normally when the difference is less than a first preset difference.

8. The method for adjusting image presence on the display device of claim 6, further comprising determining that the display device is worn normally when point coordinates of a pupil center in the first image belong to a preset range of the first image and when the point coordinates of the pupil center in the second image belong to a preset range of the second image.

9. The method for adjusting image presence on the display device of claim 6, further comprising:
    calculating a third distance between point coordinates of a pupil center in the first image and a reference position in the first image;

calculating a fourth distance between point coordinates of a pupil center in the second image and a reference position in the second image; and determining that the display device is worn normally when a difference between the third distance and the fourth distance is less than a second preset difference.

10. The method for adjusting image presence on the display device of claim 6, further comprising prompting, in a preset prompt manner, the user to re-wear the display device when the display device is worn abnormally.

11. The method for adjusting image presence on the display device of claim 5, further comprising:

detecting an eye-open status of the user based on the first distance, the second distance, the first image, and the second image;

normalizing the first image based on the first distance and the second distance; and normalizing the second image based on the first distance and the second distance when the eye-open status is normal.

12. The method for adjusting image presence on the display device of claim 11, further comprising:

calculating a ratio of a left pupil diameter to a preset pupil diameter to obtain a first specified coefficient;

calculating a ratio of a right pupil diameter to the preset pupil diameter to obtain a second specified coefficient, detecting the preset pupil diameter when the distance between the first lens and the left eyeball is a preset reference distance and the eye-open status is normal; or detecting the preset pupil diameter when the distance between the second lens and the right eyeball is the preset reference distance and the eye-open status is normal;

determining the left pupil diameter based on the first image;

determining the right pupil diameter based on the second image; and determining that the eye-open status is normal when both a difference between a first scaling coefficient and the first specified coefficient and a difference between a second scaling coefficient and the second specified coefficient are less than a third preset difference, wherein the first scaling coefficient is a ratio of the first distance to the preset reference distance, and wherein the second scaling coefficient is a ratio of the second distance to the preset reference distance.

13. The method for adjusting image presence on the display device of claim 12, wherein the preset pupil diameter is an average value of sample pupil diameters based on a plurality of first image samples from the display device or a plurality of second image samples from the display device.

14. The method for adjusting image presence on the display device of claim 5, further comprising:

obtaining a user identity of the user; and storing a correspondence between the user identity and the interpupillary distance of the user.

15. A computer program product comprising computer-executable instructions stored on a non-transitory computer-readable medium that, when executed by a processor, cause a display device to:

obtain a first image comprising a left eyeball image of a user;

obtain a second image comprising a right eyeball image of the user;

obtain a first distance between a first lens and the left eyeball of the user, wherein the first lens is closest to the left eyeball of the user;

obtain a second distance between a second lens and the right eyeball of the user, wherein the second lens is closest to the right eyeball of the user in all the lenses of the display device;

normalize the first image based on the first distance and the second distance;

normalize the second image based on the first distance and the second distance;

calculate an interpupillary distance between the left eyeball and the right eyeball based on a normalized first image and a normalized second image;

adjust the first lens or the second lens based on the interpupillary distance of the user;

calculate a ratio of the first distance to a preset reference distance to obtain a first scaling coefficient;

obtain a pupil image with a preset size, wherein the preset reference distance is either between the first lens and the left eyeball of the user, or between the second lens and the right eyeball of the user;

calculate a ratio of the second distance to the preset reference distance to obtain a second scaling coefficient;

scale the first image using the first scaling coefficient; and scale the second image using the second scaling coefficient.

16. The computer program product of claim 15, wherein the instructions further cause the display device to:

detect a wear status of the display device based on the first distance and either the second distance or the second image; and normalize the first image based on the first distance and the second distance and normalizing the second image based on the first distance and the second distance when the display device is worn normally.

* * * * *

UNITED STATES PATENT AND TRADEMARK OFFICE
CERTIFICATE OF CORRECTION

PATENT NO. : 11,115,648 B2
APPLICATION NO. : 16/854419
DATED : September 7, 2021
INVENTOR(S) : Mu Liu Page 1 of 1

It is certified that error appears in the above-identified patent and that said Letters Patent is hereby corrected as shown below:

In the Claims

Claim 12, Column 27, Line 26: "specified coefficient," should read "specified coefficient;"

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*